(12) United States Patent
Lee et al.

(10) Patent No.: US 11,322,848 B2
(45) Date of Patent: May 3, 2022

(54) ELECTRONIC DEVICE INCLUDING HELICAL ANTENNA

(71) Applicant: SAMSUNG ELECTRONICS CO., LTD., Suwon-si (KR)

(72) Inventors: Seunghak Lee, Suwon-si (KR); Jaerok Cho, Suwon-si (KR); Wanjae Ju, Suwon-si (KR); Jaehan Kim, Suwon-si (KR); Jungyong Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 46 days.

(21) Appl. No.: 17/011,328

(22) Filed: Sep. 3, 2020

(65) Prior Publication Data

US 2021/0066807 A1    Mar. 4, 2021

(30) Foreign Application Priority Data

Sep. 3, 2019 (KR) .................. 10-2019-0109180

(51) Int. Cl.
*H01Q 11/08* (2006.01)
*H01Q 1/24* (2006.01)
(Continued)

(52) U.S. Cl.
CPC .......... *H01Q 11/08* (2013.01); *H01Q 1/2208* (2013.01); *H01Q 1/243* (2013.01); *H01Q 1/38* (2013.01)

(58) Field of Classification Search
CPC ........ H01Q 1/38; H01Q 11/08; H01Q 1/2208; H01Q 1/243; H04B 5/0081
See application file for complete search history.

(56) References Cited

U.S. PATENT DOCUMENTS 10,185,913 B2    1/2019  Orihara et al.
2015/0318609 A1* 11/2015 Tomonari ................. H01Q 7/00
                                                         343/788
(Continued)

FOREIGN PATENT DOCUMENTS

CN        104380850 A  *  2/2015  ............. H01F 41/02
KR    10-2018-0099294       9/2018
(Continued)

OTHER PUBLICATIONS

International Search Report and Written Opinion dated Dec. 11, 2020 in corresponding International Application No. PCT/KR2020/011845.

*Primary Examiner* — Graham P Smith
*Assistant Examiner* — Jae K Kim
(74) *Attorney, Agent, or Firm* — Nixon & Vanderhye, P.C.

(57) ABSTRACT

According to various embodiments, an electronic device may include: a housing including a front plate and a rear plate disposed opposite the front plate; a display disposed in a space between the front plate and the rear plate and viewable through at least a portion of the front plate; an antenna structure including at least one coil having a first surface facing the rear plate in the space and a second surface facing a direction opposite the first surface, the antenna structure configured to transmit and/or receive a signal of a selected or designated frequency; a first magnetic sheet disposed at the first surface; a second magnetic sheet at least partially overlapping the first magnetic sheet when viewed from above the rear plate, the second magnetic sheet being disposed at the second surface; and a third magnetic sheet disposed closer to the rear plate than the second surface, and spaced apart from the first magnetic sheet to have electromagnetically designated isolation with the first
(Continued)

magnetic sheet with the second magnetic sheet interposed therebetween, when viewed from above the rear plate.

20 Claims, 15 Drawing Sheets

(51) Int. Cl.
    *H01Q 1/22*           (2006.01)
    *H01Q 1/38*           (2006.01)

(56)           References Cited

U.S. PATENT DOCUMENTS

| | | | |
|---|---|---|---|
| 2016/0064823 A1* | 3/2016 | Tsukuda | H01Q 1/526 |
| | | | 343/702 |
| 2016/0226146 A1* | 8/2016 | Komachi | H01Q 1/2225 |
| 2017/0005395 A1* | 1/2017 | Komachi | H01Q 7/06 |
| 2017/0033435 A1 | 2/2017 | Nakano | |
| 2018/0069294 A1* | 3/2018 | Kang | H01Q 1/2291 |
| 2018/0069299 A1* | 3/2018 | Kang | H04B 5/0056 |
| 2018/0198209 A1* | 7/2018 | Kang | H04B 5/0056 |
| 2018/0205140 A1* | 7/2018 | Chiu | G04R 60/06 |
| 2018/0301790 A1 | 10/2018 | Kim et al. | |
| 2019/0020380 A1* | 1/2019 | Chiu | H04B 5/0081 |

FOREIGN PATENT DOCUMENTS

| | | |
|---|---|---|
| KR | 10-1927955 | 12/2018 |
| KR | 10-1991011 | 6/2019 |

\* cited by examiner

ELECTRONIC DEVICE INCLUDING HELICAL ANTENNA

CROSS-REFERENCE TO RELATED APPLICATION

This application is based on and claims priority under 35 U.S.C. § 119 to Korean Patent Application No. 10-2019-0109180, filed on Sep. 3, 2019, in the Korean Intellectual Property Office, the disclosure of which is incorporated by reference herein in its entirety.

BACKGROUND

Field

The disclosure relates to an electronic device including a helical antenna.

Description of Related Art

As electronic devices such as smart phones have a wider range of available applications, the number of antennas included in the electronic devices is constantly increasing. In recent years, the trend of such electronic devices is to implement a designated performance while pursuing a slimming form factor.

The electronic device may include, for example, a rear plate forming a rear surface thereof and a helical antenna (e.g., helical conductive pattern) disposed near the rear plate therein. There may be various conductive members around the helical antenna, and it is becoming more difficult to design a helical antenna in a limited space because of slimness of the electronic device while reducing a decrease in antenna radiation performance because of the conductive member.

SUMMARY

Embodiments of the disclosure provide an electronic device including a helical antenna for improving and/or securing a radiation performance by disposing a plurality of magnetic sheets.

According to various example embodiments of the disclosure, an electronic device includes: a housing including a front plate and a rear plate disposed opposite the front plate; a display disposed in a space between the front plate and the rear plate and viewable through at least a portion of the front plate; an antenna structure including at least one coil having a first surface facing the rear plate in the space and a second surface facing a direction opposite the first surface, the antenna structure configured to transmit and/or receive a signal of a selected or designated frequency; a first magnetic sheet disposed at the first surface; a second magnetic sheet at least partially overlapping the first magnetic sheet when viewed from above the rear plate, the second magnetic sheet being disposed at the second surface; and a third magnetic sheet disposed closer to the rear plate than the second surface, and spaced apart from the first magnetic sheet to have electromagnetically designated isolation with the first magnetic sheet with the second magnetic sheet interposed therebetween, when viewed from above the rear plate.

BRIEF DESCRIPTION OF THE DRAWINGS

The above and other aspects, features and advantages if certain embodiments of the present disclosure will be more apparent from the following detailed description, taken in conjunction with the accompanying drawings, in which.

DETAILED DESCRIPTION

The following description with reference to the accompanying drawings is provided to describe various example embodiments of the disclosure. The disclosure includes various details to assist in that understanding but these are to be regarded merely as examples. Accordingly, those of ordinary skill in the art will recognize that various changes and modifications of the various example embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used to enable a clear and consistent understanding of the disclosure. Accordingly, it should be apparent to those skilled in the art that the following description of various example embodiments of the disclosure is provided for illustration purpose only and not for the purpose of limiting the disclosure.

It is to be understood that the singular forms "a," "an," and "the" include plural referents unless the context clearly dictates otherwise. Thus, for example, reference to "a component surface" includes reference to one or more of such surfaces.

Figure 1:
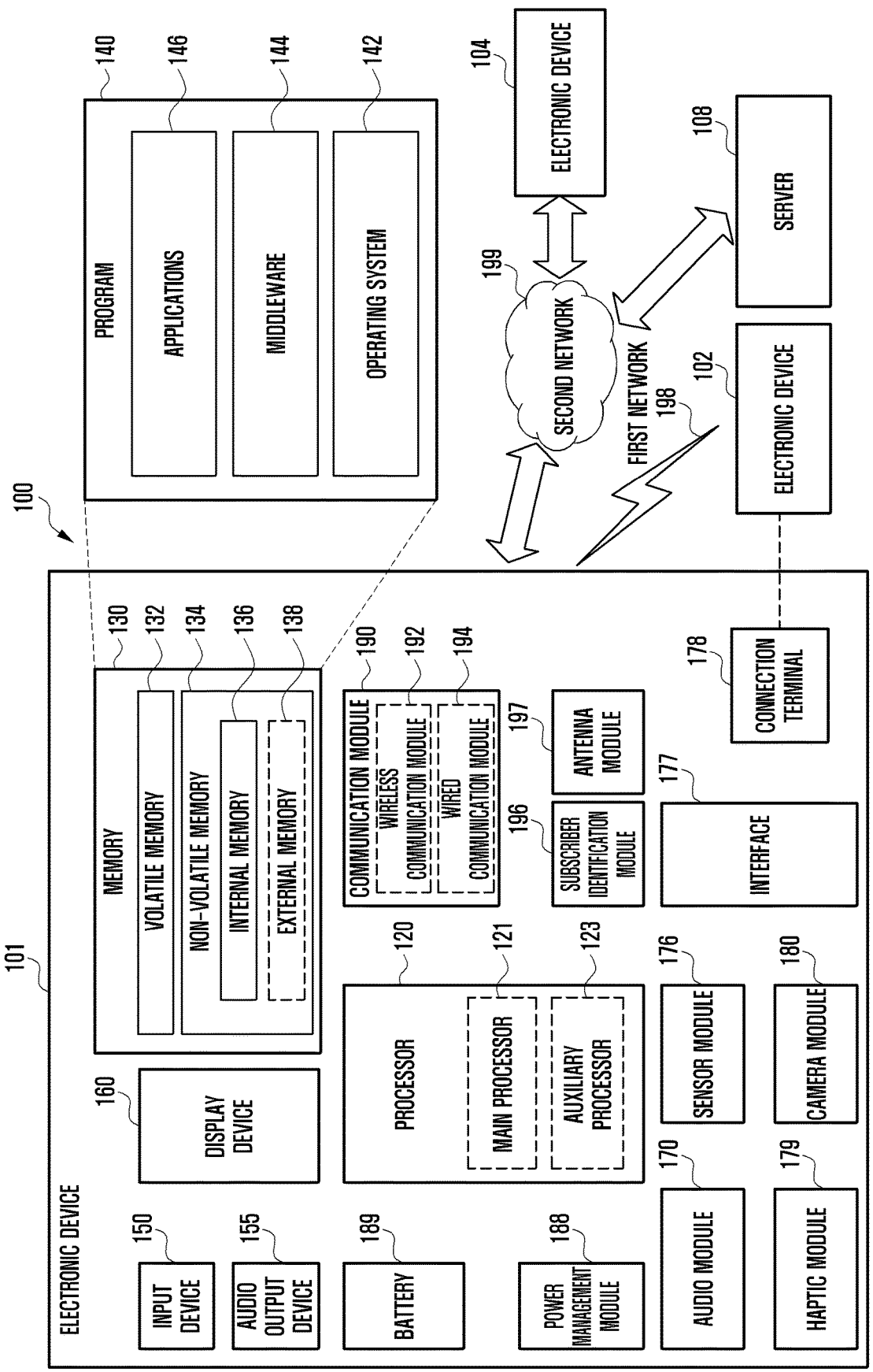
FIG. 1 is a block diagram illustrating an example electronic device in a network environment according to an embodiment.

FIG. 1 is a block diagram illustrating an example electronic device 101 in a network environment 100 according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identity module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or external memory 138.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezo-electric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a PCB). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to an embodiment may be one of various types of electronic devices. The electronic device may include a portable communication device (e.g., a smart phone), a computer device, a portable multimedia device, a portable medical device, a camera, a wearable device, a home appliance, or the like. However, the electronic device is not limited to any of those described above.

Various embodiments of the disclosure and the terms used herein are not intended to limit the technological features set forth herein to particular embodiments and include various changes, equivalents, or replacements for a corresponding embodiment.

With regard to the description of the drawings, similar reference numerals may be used to refer to similar or related elements.

A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases.

As used herein, such terms as "1st" and "2nd", or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

The term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2A:
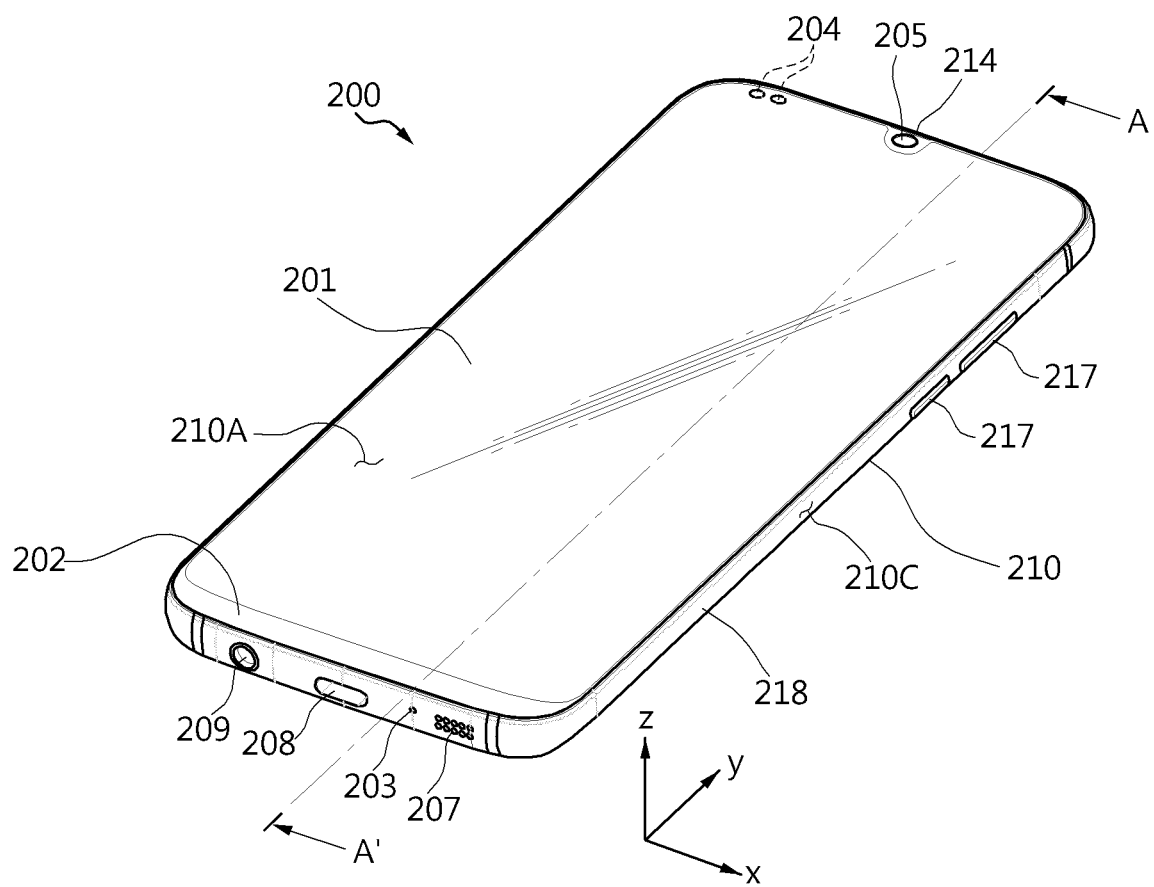
FIG. 2A is a front perspective view illustrating an example mobile electronic device according to an embodiment.

FIG. 2A is a front perspective view of an example mobile electronic device 200 according to an embodiment of the disclosure.

Figure 2B:
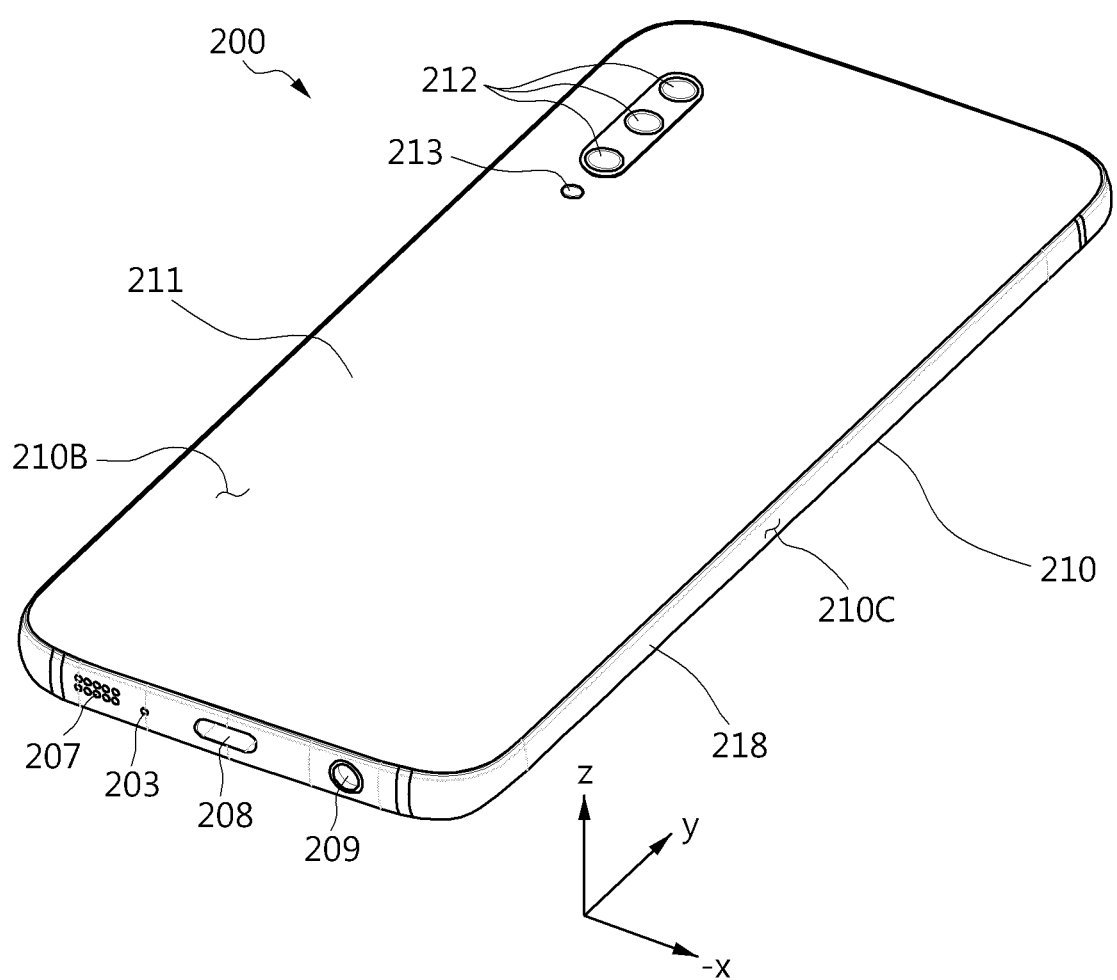
FIG. 2B is a rear perspective view illustrating the electronic device of FIG. 2A according to an embodiment.

FIG. 2B is a rear perspective view of the electronic device 200 of FIG. 2A according to an embodiment of the disclosure.

Referring to FIGS. 2A and 2B, according to an embodiment, an electronic device 200 may include a housing 210 that includes a first surface (or front surface) 210A, a second surface (or rear surface) 210B, and a lateral surface 210C that surrounds a space between the first surface 210A and the second surface 210B. According to another embodiment, the housing 210 may refer to a structure that forms a part of the first surface 210A, the second surface 210B, and the lateral surface 210C. According to an embodiment, the first surface 210A may be formed of a front plate 202 (e.g., a glass plate or polymer plate coated with a variety of coating layers) at least a part of which is substantially transparent. The second surface 210B may be formed of a rear plate 211 which is substantially opaque. The rear plate 211 may be formed of, for example, coated or colored glass, ceramic, polymer, metal (e.g., aluminum, stainless steel (STS), or magnesium), or any combination thereof. The lateral surface 210C may be formed of a lateral bezel structure (or "lateral member") 218 which is combined with the front plate 202 and the rear plate 211 and includes a metal and/or polymer. The rear plate 211 and the lateral bezel structure 218 may be integrally formed and may be of the same material (e.g., a metallic material such as aluminum).

According to an embodiment, the electronic device 200 may include at least one of a display 201, audio modules 203, 207 and 214, sensor module 204, camera modules 205, 212 and 213, key input devices 217, and connector holes 208 and 209. In various embodiments, the electronic device 200 may omit at least one (e.g., the key input devices 217) of the above components, or may further include other components (e.g., a fingerprint sensor, or a light emitting device). In various embodiments, the electronic device 200 may include the electronic device 101 of FIG. 1.

The display 201 may be viewable through a substantial portion of the front plate 202, for example. In various embodiments, outlines (i.e., edges and corners) of the display 201 may have substantially the same form as those of the front plate 202. In another embodiment (not shown), the spacing between the outline of the display 201 and the outline of the front plate 202 may be substantially unchanged in order to enlarge the exposed area of the display 201.

In another embodiment (not shown), a recess or opening may be formed in a portion of a display area of the display 201 to accommodate or to be aligned with at least one of the audio modules (e.g., the audio module 214), the sensor module 204, and the camera module 205. In another embodiment (not shown), at least one of the audio modules (e.g., the audio module 214), the sensor module 204, and the camera module 205 may be disposed on the back of the display area of the display 201. In another embodiment (not shown), the display 201 may be combined with, or adjacent to, a touch sensing circuit, a pressure sensor capable of measuring the touch strength (pressure), and/or a digitizer for detecting a stylus pen.

The audio modules 203, 207 and 214 may correspond to a microphone hole (e.g., the audio module 203) and speaker holes (e.g., the audio modules 207 and 214). The microphone hole may contain a microphone disposed therein for acquiring external sounds and, in a case, contain a plurality of microphones to sense a sound direction. The speaker holes may be classified into an external speaker hole and a call receiver hole. In various embodiments, the microphone hole and the speaker holes may be implemented as a single hole, or a speaker (e.g., a piezo speaker) may be provided without the speaker holes.

The sensor module 204 may generate electrical signals or data corresponding to an internal operating state of the electronic device 200 or to an external environmental condition. The sensor module 204 may include, for example, a proximity sensor. The proximity sensor may generate signals of a proximity of an external object based on lights that pass through the first surface 210A of the housing 210. In various embodiments, the sensor module 204 may include a biometric sensor. In various embodiments (not shown), the electronic device 200 may include another sensor module, such as a heart rate monitor (HRM) sensor or a fingerprint sensor, disposed on the second surface 210B of the housing 210. The fingerprint sensor may be disposed on the second surface 210B as well as the first surface 210A (e.g., the display 201) of the housing 210. The electronic device 200 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor (e.g., the sensor module 204).

The camera modules 205, 212 and 213 may include a first camera device (e.g., the camera module 205), a second camera device (e.g., the camera module 212), and/or flash (e.g., the camera module 213). The first camera device may generate image signals based on lights that pass through a first surface 210A of the housing 210. The second camera device and the flash may be disposed on the second surfaced 210B of the housing 210. The camera module 205 or the camera module 212 may include one or more lenses, an image sensor, and/or an image signal processor. The flash may include, for example, a light emitting diode or a xenon lamp. In various embodiments, two or more lenses (infrared cameras, wide angle and telephoto lenses) and image sensors may be disposed on one side of the electronic device 200.

The key input devices 217 may be disposed on the lateral surface 210C of the housing 210. In another embodiment, the electronic device 200 may not include some or all of the key input devices 217 described above, and the key input devices 217 which are not included may be implemented in another form such as a soft key on the display 201. In various embodiments, the key input devices 217 may include a sensor module (not shown) disposed on the second surface 210B of the housing 210.

The light emitting device (not shown) may be disposed on the first surface 210A of the housing 210, for example. For example, the light emitting device may provide status information of the electronic device 200 in an optical form. In various embodiments, the light emitting device may provide a light source associated with the operation of the camera module 205. The light emitting device may include, for example, a light emitting diode (LED), an infrared (IR) LED, or a xenon lamp.

The connector holes 208 and 209 may include a first connector hole (e.g., the connector hole 208) adapted for a connector (e.g., a universal serial bus (USB) connector) for transmitting and receiving power and/or data to and from an external electronic device, and/or a second connector hole (e.g., the connector hole 209) adapted for a connector (e.g., an earphone jack) for transmitting and receiving an audio signal to and from an external electronic device.

Figure 3:
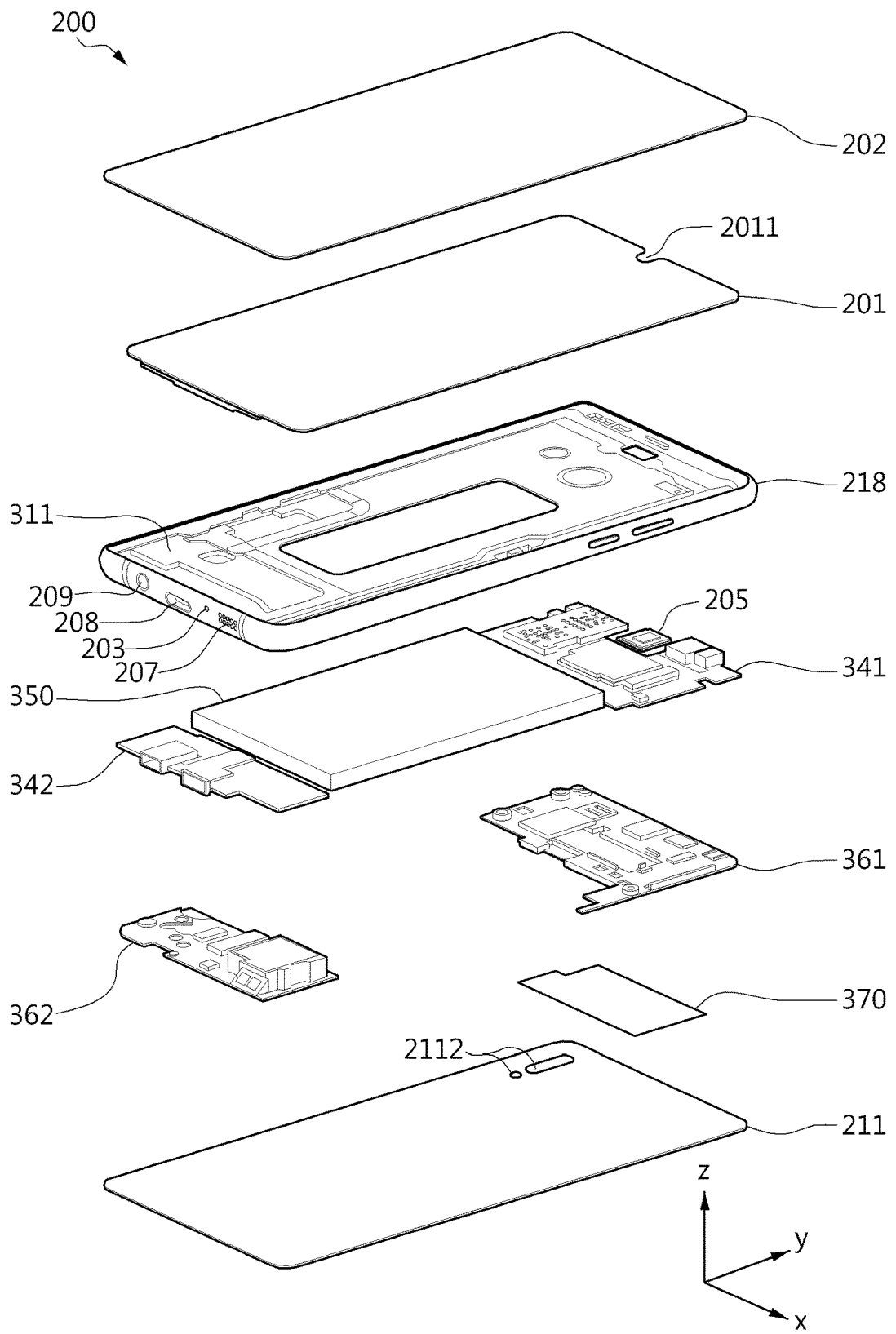
FIG. 3 is an exploded perspective view illustrating the electronic device of FIG. 2A according to an embodiment.

FIG. 3 is an exploded perspective view illustrating the electronic device 200 of FIGS. 2A and 2B according to an embodiment.

Referring to FIG. 3, according to an embodiment, the electronic device 200 may include a side bezel structure 218, first support member 311 (e.g., bracket), front plate 202, display 201, first substrate assembly 341, second substrate assembly 342, battery 350, second support member 361, third support member 362, antenna structure 370, and/or rear plate 211. In some embodiments, the electronic device 200 may omit at least one (e.g., the first support member 311, the second support member 361, or the third support member 362) of the components or may additionally include other components. At least one of the components of the electronic device 200 may be the same as or similar to at least one of the components of the electronic device 200 of FIG. 2A or 2B, and repeated descriptions thereof will be omitted below.

The first support member 311 may be, for example, disposed inside the electronic device 200 to be connected to the side bezel structure 218 or may be integrally formed with the side bezel structure 218. The first support member 311 may be made of, for example, a metal material and/or a non-metal (e.g., polymer) material.

The display 201 may be, for example, coupled to one surface of the first support member 311 and disposed between the first support member 311 and the front plate 202. The first substrate assembly 341 and the second substrate assembly 342 may be, for example, coupled to the other surface of the first support member 311 and disposed between the first support member 311 and the rear plate 211.

According to an example embodiment, the first substrate assembly 341 may include a first printed circuit board (PCB). The display 201 or a first camera device 205 may be electrically connected to the first printed circuit board through various electrical paths such as a flexible printed circuit board (FPCB). The first substrate assembly 341 may include various electronic components electrically connected to the first printed circuit board. The electronic component may be disposed at the first printed circuit board or may be electrically connected to the first printed circuit board through an electrical path such as a cable or an FPCB. The electronic component may include, for example, at least some of the components included in the electronic device 101 of FIG. 1.

According to various embodiments, the first substrate assembly 341 may include a main PCB, a slave PCB disposed to partially overlap the main PCB, and/or an interposer substrate between the main PCB and the slave PCB, when viewed from above the rear plate 211.

According to an example embodiment, the second substrate assembly 342 may be spaced apart from the first substrate assembly 341 with the battery 350 interposed therebetween, when viewed from above the front plate 202. The second substrate assembly 342 may include a second printed circuit board electrically connected to the first printed circuit board of the first substrate assembly 341. The second substrate assembly 342 may include various electronic components electrically connected to the second printed circuit board. The electronic component may be disposed at the second printed circuit board or may be electrically connected to the second printed circuit board through an electrical path such as a cable or an FPCB. The electronic component may include, for example, some of the components included in the electronic device 101 of FIG. 1. According to an embodiment, the electronic component may be a universal serial bus (USB) connector using the first connector hole 208, an earphone jack using a second connector hole 209, a microphone using a microphone hole 203, or a speaker using a speaker hole 207.

According to an embodiment, the battery 350 may be disposed between the first support member 311 and the rear plate 211 and may be coupled to the first support member 311. The battery 350 may refer, for example, to a device for supplying power to at least one component of the electronic device 200 and may include, for example, a non-rechargeable primary cell, a rechargeable secondary cell, or a fuel cell. At least a portion of the battery 350 may be disposed, for example, on substantially the same plane as a first printed circuit board of the first substrate assembly 341 or a second printed circuit board of the second substrate assembly 342. The battery 350 may be integrally disposed inside the electronic device 200 or may be detachably disposed from the electronic device 200.

According to an example embodiment, the second support member 361 may be disposed between the first support member 311 and the rear plate 211, and be coupled to the first support member 311 through a fastening element such as a bolt. At least a portion of the first substrate assembly 341 may be disposed between the first support member 311 and the second support member 361, and the second support member 361 may cover and protect the first substrate assembly 341.

According to an embodiment, the third support member 362 may be spaced apart from the second support member 361 with the battery 350 interposed therebetween, when viewed from above the front plate 202. The third support member 362 may be disposed between the first support member 311 and the rear plate 211, and be coupled to the first support member 311 through a fastening element such as a bolt. At least a portion of the second substrate assembly 342 may be disposed between the first support member 311 and the third support member 362, and the third support member 362 may cover and protect the second substrate assembly 342.

According to an embodiment, the second support member 361 and/or the third support member 362 may be made of a metal material and/or a non-metal material (e.g., polymer). According to various embodiments, the second support member 361 and/or the third support member 362 may be referred to as a rear case.

According to an embodiment, the antenna structure 370 may be disposed between the second support member 361 and the rear plate 211. The antenna structure 370 may be implemented in a film form of, for example, an FPCB. According to an embodiment, the antenna structure 370 may include, for example, at least one conductive pattern used as a loop type emitter. For example, the at least one conductive pattern may include a planar helical conductive pattern (e.g., flat coil or pattern coil).

According to an embodiment, a conductive pattern of the antenna structure 370 may be electrically connected to a wireless communication circuit (e.g., the wireless communication module 192 of FIG. 1) disposed at the first substrate assembly 341. For example, the conductive pattern may be used for short range wireless communication such as near field communication (NFC). As another example, the conductive pattern may be used in magnetic secure transmission (MST) for transmitting and/or receiving magnetic signals. However, the disclosure is not limited thereto, and the conductive pattern may be used for various purposes.

According to various embodiments, a conductive pattern of the antenna structure 370 may be electrically connected to a power transmission/reception circuit disposed at the first substrate assembly 341. The power transmission/reception circuit may wirelessly receive power from an external electronic device through a conductive pattern or may wirelessly transmit power to an external electronic device. The power transmission/reception circuit may include a power management integrated circuit (PMIC) included in the power management module 188 of FIG. 1 or a charger integrated circuit (IC) and charge the battery 350 using power received through a conductive pattern 350.

According to an example embodiment, the display 201 may include an opening 2011 formed in at least a partial area corresponding to an optical sensor (e.g., the first camera device 205 or the biometric sensor) disposed inside the electronic device 200. The opening 2011 may be formed in, for example, a notch form. According to some embodiments, the opening 2011 may be implemented in the form of a through hole. The optical sensor may receive external light through the opening 2011 of the display 201 and some area of the front plate 202 aligned with the opening 2011. According to various embodiments (not illustrated), the opening 2011 of the display 201 may be replaced to be implemented into a substantially transparent area formed by changing a pixel structure and/or a wiring structure.

According to an example embodiment, the rear plate 211 may include an opening 2112 for exposing and disposing the second camera device 212 and the flash 213 included in the first substrate assembly 341 at the rear surface 210B.

Figure 4:
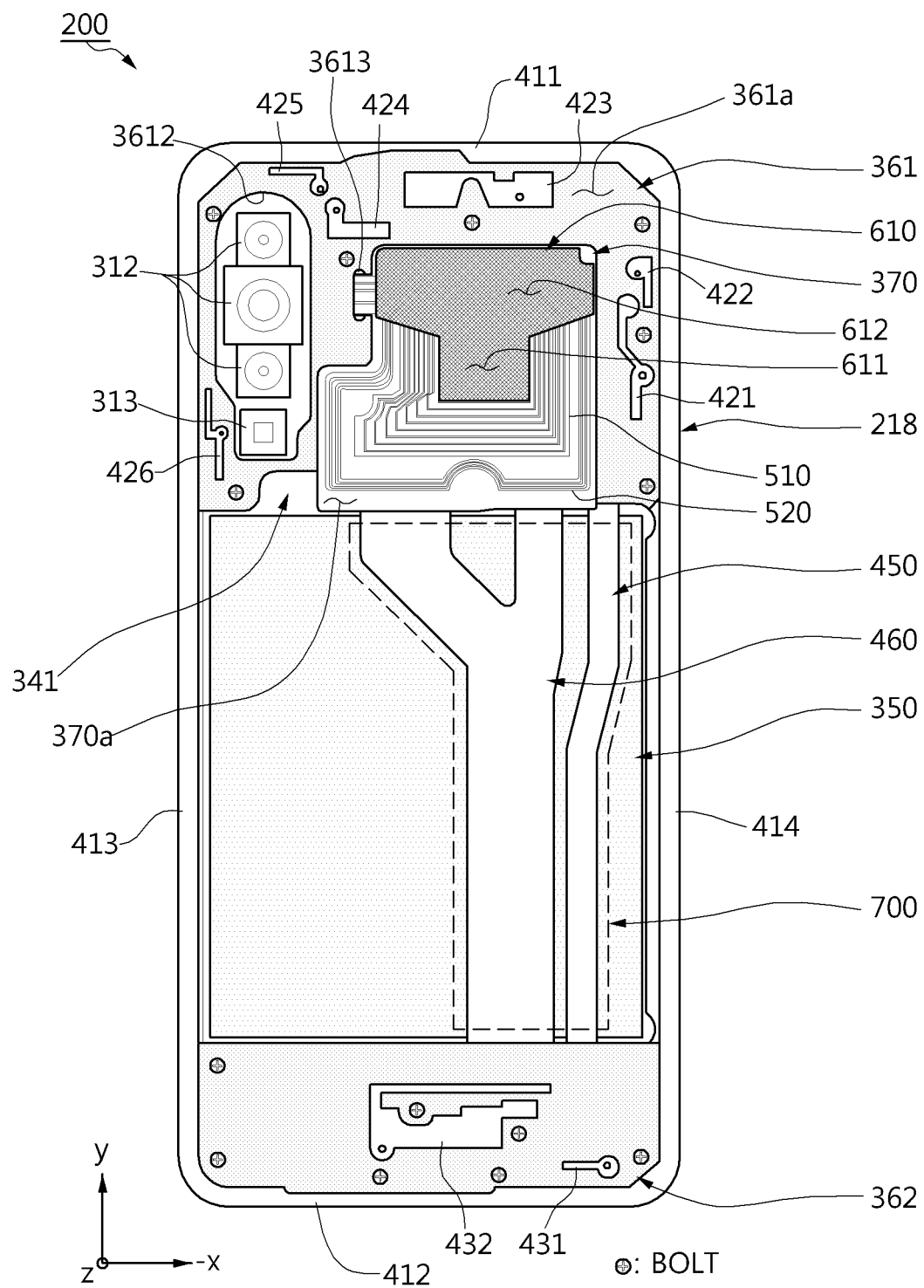
FIG. 4 is a diagram illustrating a state in which a rear plate is separated from the electronic device of FIG. 2A according to an embodiment.

FIG. 4 is a diagram illustrating a state in which the rear plate 211 is separated from the electronic device 200 of FIG. 2A according to an embodiment.

Referring to FIG. 4, the electronic device 200 may include a side member 218, a second support member 361, a third support member 362, a battery 350, a plurality of electrical paths 450 and 460, an antenna structure 370, and/or a first magnetic sheet 610.

According to an embodiment, the side member 218 may include a first side portion 411, a second side portion 412, a third side portion 413, or a fourth side portion 414. For example, the first side portion 411 may be disposed at the side opposite to that of the second side portion 412 and be substantially parallel to the second side portion 412. The third side portion 413 may connect one end portion (not illustrated) of the first side portion 411 and one end portion (not illustrated) of the second side portion 412. For example, the fourth side portion 414 may connect the other end portion (not illustrated) of the first side portion 411 and the other end portion (not illustrated) of the second side portion 412. The fourth side portion 414 may be disposed at the side opposite to that of the third side portion 413 and be substantially parallel to the third side portion 413.

According to an embodiment, the second support member 361 may be formed in a plate shape capable of at least partially covering the first substrate assembly 341. The second support member 361 may be made of a non-conductive material, for example, a polymer. The second support member 361 may include a plurality of through holes (not illustrated) and may be coupled by a bolt to the first support member 311 of FIG. 3 through the plurality of through holes.

According to an example embodiment, the second support member 361 may include an opening 3612. A second camera device 312 and/or a flash 313 included in the first substrate assembly 341 may be disposed at the opening 3612 of the second support member 361. The second camera device 312 and/or the flash 313 may be exposed at the rear surface 210B (see FIG. 2B) through the opening 2112 formed in the rear plate 211 of FIG. 3.

According to an example embodiment, the opening 3612 of the second support member 361 may be formed closer to the third side portion 413 than the fourth side portion 414. The opening 3612 may be formed closer to the first side portion 411 than the second side portion 412. According to an example embodiment, the opening 3612 may include may have a larger width in a direction (e.g., y-axis direction) between the first side portion 411 and the second side portion 412 than a width in a direction (e.g., x-axis direction) between the third side portion 413 and the fourth side portion 414.

According to an embodiment, a plurality of conductive patterns 421, 422, 423, 424, 425, and 426 may be disposed at the second support member 361. The plurality of conductive patterns 421, 422, 423, 424, 425, and 426 may be electrically connected to, for example, a wireless communication circuit (e.g., the wireless communication module 192 of FIG. 1) disposed at the first printed circuit board of the first substrate assembly 341 to operate as an antenna radiator. The second support member 361 may include one surface 361a facing the rear plate 211 of FIG. 3 and the other surface (not illustrated) disposed at the side opposite to that of the one surface 361a and facing the first substrate assembly 341 of FIG. 3. In an example embodiment, at least a portion of the plurality of conductive patterns 421, 422, 423, 424, 425, and 426 may include a first portion (not illustrated) disposed at the one surface 361a of the second support member 361 and a second portion (not illustrated) extended from the first portion to be disposed at the other surface of the second support member 361. A connecting portion between the first portion and the second portion may penetrate through holes formed in the second support member 361. According to some embodiments (not illustrated), the connecting portion between the first portion and the second portion may be disposed at a side surface (not illustrated) of the second supporting member 361 adjacent to the side member 218 according to a position of the conductive pattern. A flexible conductive member such as a C clip (e.g., C-shaped spring), a pogo-pin, a spring, a conductive poron, conductive rubber, a conductive tape, a cooper connector, or the like, may be disposed between the first printed circuit board of the first substrate assembly 341 and the second portion. For example, the wireless communication circuit disposed at the first printed circuit board may feed a radiating current to the second portion serving as a feeding unit through the flexible conductive member.

According to an embodiment, at least some of the plurality of conductive patterns 421, 422, 423, 424, 425, and 426 may be implemented into laser direct structuring (LDS). According to various embodiments, at least some of the plurality of conductive patterns 421, 422, 423, 424, 425, and 426 may be implemented in various forms such as plating, printing, sus, FPCB, or the like.

According to an embodiment, the third support member 362 may be formed in a plate shape capable of at least partially covering the first substrate assembly 341 of FIG. 3. The third support member 362 may be made of a non-conductive material, for example, a polymer. The third support member 362 may include a plurality of through holes (not illustrated) and be coupled by a bolt to the first support member 311 of FIG. 3 through the plurality of through holes.

According to an embodiment, a plurality of conductive patterns 431 and 432 may be disposed at the third support member 362. At least some of the plurality of conductive patterns 431 and 432 may be electrically connected to a wireless communication circuit (e.g., the wireless communication module 192 of FIG. 1) disposed at the first printed circuit board of the first substrate assembly 341 to operate as an antenna radiator. The plurality of conductive patterns 431 and 432 may be implemented in substantially the same manner as the plurality of conductive patterns 421, 422, 423, 424, 425, and 426 disposed at the second support member 361 and a detailed description thereof is omitted.

According to various embodiments, the position, number, or shape of the conductive pattern disposed at the second support member 361 or the third support member 362 to serve as an antenna radiator may be various without being limited to FIG. 4.

According to an embodiment, the battery 350 may be disposed in a recess formed by the first support member 311, the first substrate assembly 341, the second substrate assembly 342, the third side portion 413, and the fourth side portion 414 of FIGS. 3 and 4. The recess may be, for example, a concave space that can fit the battery 350 in the form of a square plate.

According to an example embodiment, the electronic device 200 may include a plurality of electrical paths 450 and 460 that electrically connect the first printed circuit board included in the first substrate assembly 341 and the second printed circuit board included in the second substrate assembly 342 of FIG. 3. Various signals may be transferred through the plurality of electrical paths 450 and 460 between the first printed circuit board and the second printed circuit board. In an example embodiment, at least one of the plurality of electrical paths 450 and 460 may be omitted.

For example, referring to FIGS. 3 and 4, in a state in which an external electronic device (e.g., the electronic device 102 of FIG. 1) is connected through an earphone jack of the second substrate assembly 342 using the second connector hole 209, audio signals output from various electronic components (e.g., the audio module 170 of FIG. 1) included in the first substrate assembly 341 may be transferred to an external electronic device through an electrical path 450 or 460 and an earphone jack.

For example, referring to FIGS. 3 and 4, audio signals output from various electronic components (e.g., the audio module 170 of FIG. 1) included in the first substrate assembly 341 may be transferred to the speaker included in the second substrate assembly 342 through the electrical path 450 or 460.

For example, referring to FIGS. 3 and 4, a voice signal obtained by the microphone included in the second substrate assembly 342 through the microphone hole 203 may be transferred to various electronic components (e.g., the audio module 170 of FIG. 1) included in the first substrate assembly 341 through the electrical path 450 or 460.

For example, referring to FIGS. 3 and 4, in a state in which an external electronic device (e.g., the electronic device 102 of FIG. 1) is connected through a connector of the second substrate assembly 342 using the first connector hole 208, signals output from various electronic components (e.g., various signals related to audio, video, and power) included in the first substrate assembly 341 may be transferred to external electronic devices through the electrical path 450 or 460 and the connector. Signals output from the external transmission device (e.g., various signals such as audio, video, and power) may be transferred to various electronic components included in the first substrate assembly 341 through the connector and the electrical path 450 or 460.

For example, referring to FIGS. 3 and 4, at least one of the plurality of conductive patterns 431 and 432 may be electrically connected to a second printed circuit board of the second substrate assembly 342 and be electrically connected to the wireless communication circuit (e.g., the wireless communication module 192 of FIG. 1) included in the first substrate assembly 341 through the electrical path 450 or 460. For example, at least one of the plurality of electrical paths 450 and 460 is a structure for transferring a signal (voltage, current) of a radio frequency (RF) through the conductive pattern 431 or 432 and may be a conductive system, for example, a transmission line using a wave transfer function by an electrical element (e.g., element having resistance, inductance, conductance, or capacitance per unit length).

According to an embodiment, at least one of the plurality of electrical paths 450 and 460 may be extended across the battery 350. For example, some of the plurality of electrical paths 450 and 460 may be disposed between the battery 350 and the rear plate 211 of FIG. 3.

According to an embodiment, at least one of the plurality of electrical paths 450 and 460 may include an FPCB. For example, the plurality of electrical paths 450 and 460 may include a first electrical path 450 disposed closer to the fourth side surface 414 than the third side surface 413 and a second electrical path 460 between the first electrical path 450 and the third side portions 413. The first electrical path 450 may include one end portion (not illustrated) electrically connected to the first printed circuit board of the first substrate assembly 341 and the other end portion (not illustrated) electrically connected to the second printed circuit board of the second substrate assembly 342. The second electrical path 460 may include a first end portion (not illustrated) and a second end portion (not illustrated) that are respectively electrically connected to different positions of the first printed circuit board included in the first substrate assembly 341 and a third end portion (not illustrated) electrically connected to the second printed circuit board included in the second substrate assembly 342 of FIG. 3.

According to various embodiments, a shape, location, or number of electrical paths across the battery 350 may be various without being limited to the embodiment of FIG. 4.

According to various embodiments (not illustrated), a first printed circuit board of the first substrate assembly 341 may have a protruding portion extended between the third side portion 413 and the battery 350. In this case, a size of the battery 350 may be partially reduced in a direction (e.g., −x axis direction) advancing from the third side portion 413 to the fourth side portion 414. According to various embodiments, an electrical path such as an FPCB or a cable electrically connecting the second printed circuit board included in the second substrate assembly 342 of FIG. 3 and the protruding portion may be disposed between the third side portion 413 and the battery 350. In this case, at least one of the electrical paths 450 and 460 traversing the battery 350 may be omitted.

According to various embodiments (not illustrated), the first printed circuit board of the first substrate assembly 341 may have a protruding portion extended between the fourth side portion 414 and the battery 350. In this case, a size of the battery 350 may be partially reduced in a direction (e.g., +x axis direction) advancing from the fourth side portion 414 to the third side portion 413. According to various embodiments, an electrical path such as an FPCB or a cable electrically connecting the second printed circuit board included in the second substrate assembly 342 of FIG. 3 and the protruding portion may be disposed between the fourth side portion 414 and the battery 350. In this case, at least one of the electrical paths 450 and 460 traversing the battery 350 may be omitted.

According to various embodiments (not illustrated), instead of the first printed circuit board of the first substrate assembly 341 and the second printed circuit board of the second substrate assembly 342, a one-piece printed circuit board may be provided. The one-piece printed circuit board may include a first portion disposed between the first side portion 411 and the battery 350, a second portion disposed between the second side portion 412 and the battery 350, and a third portion disposed between the third side portion 413 and the battery 350 or between the fourth side portion 414 and the battery 350 and connecting the first portion and the second portion. For the third portion, a size of the battery 350 may be partially reduced in a direction (e.g., x-axis direction) between the fourth side portion 414 and the third side portion 413. When a one-piece printed circuit board is implemented, at least one of the electrical paths 450 and 460 traversing the battery 350 may be omitted.

According to an embodiment, the antenna structure 370 may be formed in a film form to be disposed at or coupled to the second support member 361 between the second support member 361 and the rear plate 211 of FIG. 3. According to some embodiments, the antenna structure 370 may be disposed at or coupled to the rear plate 211 between the second support member 361 and the rear plate 211 of FIG. 3.

According to an embodiment, the antenna structure 370 may include one or more conductive patterns 510 and 520 used as an antenna radiator. The antenna structure 370 may be implemented into, for example, an FPCB. The antenna structure 370 may be disposed in an area that is not overlapped with a plurality of conductive patterns 421, 422, 423, 424, 425, and 426 and the opening 3612 of one surface 361*a* of the second support member 361. For example, the opening 3612 and the plurality of conductive patterns 421, 422, 423, 424, 425, and 426 may be disposed near the side member 218 to secure an area for disposing the antenna structure 370. The antenna structure 370 may be spaced apart from the conductive patterns 421, 422, 423, 424, 425, and 426 so as to be electromagnetically isolated from the conductive patterns 421, 422, 423, 424, 425, and 426 to secure a radiation performance thereof.

Figure 5:
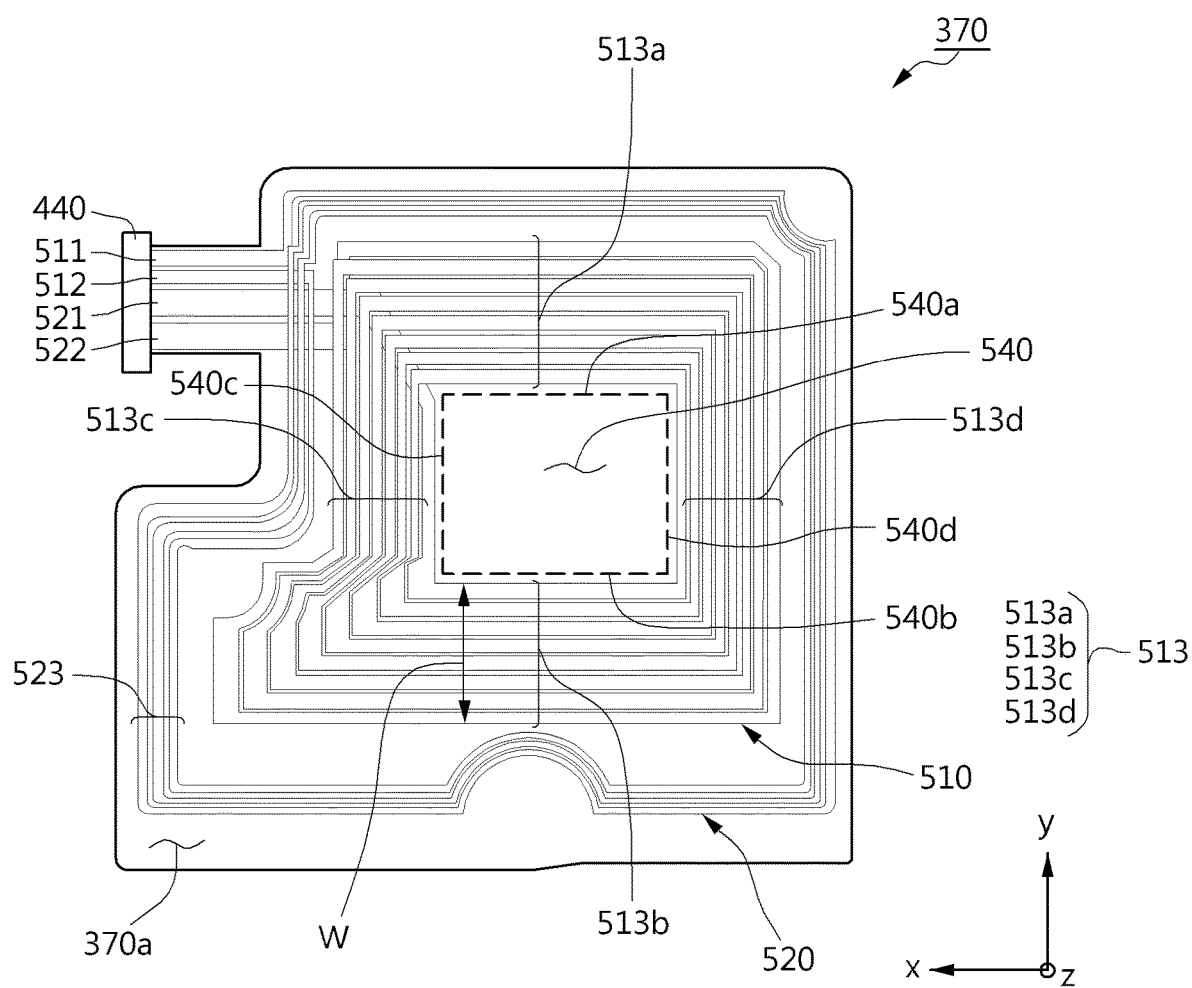
FIG. 5 is a diagram illustrating an example antenna structure of FIG. 4 according to an embodiment.

FIG. 5 is a diagram illustrating an example antenna structure 370 of FIG. 4 according to an embodiment.

Referring to FIGS. 4 and 5, the antenna structure 370 may include a first conductive pattern 510 and/or a second conductive pattern 520. According to an example embodiment, the first conductive pattern 510 or the second conductive pattern 520 may, for example, include a loop type radiator and may be implemented in, for example, a helical conductive pattern (e.g., flat coil or pattern coil) in a flat shape.

According to an embodiment, the first conductive pattern 510 may be extended from a first end portion 511 to a second end portion 512 so as to form a first coil portion (or first wound portion) 513 including a plurality of turns. According to an embodiment, the second conductive pattern 520 may be extended from a third end portion 521 to a fourth end portion 522 so as to form a second coil portion (or second wound portion) 523 including a plurality of turns. The antenna structure 370 may include a connector 440 electrically connected to the first end portion 511 and the second end portion 512 of the first conductive pattern 510, and/or the third end portion 521 and the fourth end portion 522 of the second conductive pattern 520. The connector 440 may pass through an opening 3613 formed in, for example, the second support member 361 of FIG. 4 to be electrically connected to a connector disposed at the first printed circuit board of the first substrate assembly 341.

According to an embodiment, one of the first end portion 511 and the second end portion 512 of the first conductive pattern 510 may be electrically connected to a wireless communication circuit (e.g., the wireless communication module 192 of FIG. 1), and the other one thereof may be electrically connected to a ground member (e.g., a ground plane included in the first printed circuit board of the first substrate assembly 341). The wireless communication circuit may supply a radiating current to the first conductive pattern 510 and transmit and/or receive a first signal of a first frequency band selected or designated through the first conductive pattern 510. For example, the first signal may have a frequency (e.g., about 70 kHz) of about 200 kHz or less for magnetic secure transmission (MST).

According to an embodiment, one of the third end portion 521 and the fourth end portion 522 of the second conductive pattern 520 may be electrically connected to a wireless communication circuit (e.g., the wireless communication module 192 of FIG. 1), and the other one thereof may be electrically connected to a ground member (e.g., a ground plane included in the first printed circuit board of the first substrate assembly 341). The wireless communication circuit may supply a radiating current to the second conductive pattern 520 and transmit and/or receive a second signal in a second frequency band selected or designated through the second conductive pattern 520. The second frequency band may be different from the first frequency band using the first conductive pattern 510. For example, the second signal may have a frequency of about 13.56 MHz for near field communication (NFC).

According to various embodiments, the first conductive pattern 510 may be electrically connected to a power transmission/reception circuit disposed at a first printed circuit board included in the first substrate assembly 341 of FIG. 3. The power transmission/reception circuit may wirelessly receive power from an external electronic device through the first conductive pattern 510 or may wirelessly transmit power to the external electronic device. For example, the processor (e.g., the processor 120 of FIG. 1) may control a switch according to a mode to selectively connect the first conductive pattern 510 to a wireless communication circuit or a power transmission/reception circuit.

According to various embodiments (not illustrated), the antenna structure 370 may further include a conductive line for electrically connecting between the connector 440 and a point between the first end portion 511 and the second end portion 512 of the first conductive pattern 510. The power transmission/reception circuit may use an electrical path between the first end portion 511 and the conductive line or an electrical path between the second end portion 512 and the conductive line in a mode for transmitting and/or receiving power.

According to various embodiments (not illustrated), the antenna structure 370 may include an additional conductive pattern electrically connected to a power transmission/reception circuit.

According to an embodiment, the power transmission/reception circuit may be an electromagnetic induction type power transmission/reception circuit. For example, when a magnetic field flowing to an antenna radiator (e.g., coil) of an external electronic device is applied to a conductive pattern (e.g., the first conductive pattern 510) included in the antenna structure 370, an induced current may flow through the conductive pattern. The power transmission/reception circuit may provide power (e.g., battery charging) to a load of the electronic device 200 of FIG. 2A using such an induced current. According to various embodiments, the power transmission/reception circuit may wirelessly transmit power to the external electronic device using electromagnetic induction between the antenna radiator of the external electronic device and the conductive pattern of the antenna structure 370. The electromagnetic induction type power transmission/reception circuit may follow, for example, a wireless power consortium (WPC) standard. The electromagnetic induction type power transmission/reception circuit according to the WPC standard may wirelessly receive power from the external electronic device or may wirelessly transmit power from the external electronic device using a frequency of about 110 to 205 kHz. According to various embodiments, the electromagnetic induction type power transmission/reception circuit may follow a power matter alliance (PMA) standard. The electromagnetic induction type power transmission/reception circuit according to the PMA standard may wirelessly receive power from the external electronic device or wirelessly transmit power to the external electronic device using a frequency of about 227 to 357 kHz or about 118 to 153 kHz.

According to another embodiment, the power transmission/reception circuit may be an electromagnetic resonance type power transmission/reception circuit. For example, the conductive pattern (e.g., the first conductive pattern 510) of the antenna structure 370 may have substantially the same resonant frequency as that of an antenna (e.g., coil) for transmitting and receiving power of the external electronic device. Using a resonance phenomenon between the conductive pattern of the antenna structure 370 and the antenna for power transmission and reception of the external electronic device, the power transmission/reception circuit may wirelessly receive power from the external electronic device or may wirelessly transmit power to the external electronic device. The electromagnetic resonance type power transmission/reception circuit may follow, for example, the A4WP (alliance for wireless poser) standard. The electromagnetic resonance type power transmission/reception circuit according to the A4WP standard may wirelessly receive power from the external electronic device or may wirelessly transmit power to the external electronic device using a resonance frequency of about 6.78 MHz.

According to an embodiment, the antenna structure 370 may include a coil inner area (or coil inside) 540. The coil inner area 540 may refer, for example, to an area enclosed by the first coil portion 513 of the first conductive pattern 510. According to an embodiment, the first coil portion 513 may be disposed around the rectangular coil inner area 540 and form, for example, a planar spiral coil of a square shape. When a radiation current is supplied to the first conductive pattern 510, a magnetic force generated in the first conductive pattern 510 may pass through the coil inner area 540.

According to various embodiments (not illustrated), the coil inner area 540 may be implemented in various other forms such as a circle without being limited to a rectangle. The first conductive pattern 510 may be implemented with a planar helical coil of various shapes according to a shape of the coil inner area 540.

According to an embodiment, a second coil portion 523 of the second conductive pattern 520 may be disposed outside the first coil portion 513 of the first conductive pattern 510. According to various embodiments, when a radiating current is supplied to the second conductive pattern 520, a magnetic force generated in the second conductive pattern 520 may pass through the coil inner area 540.

Figure 6:
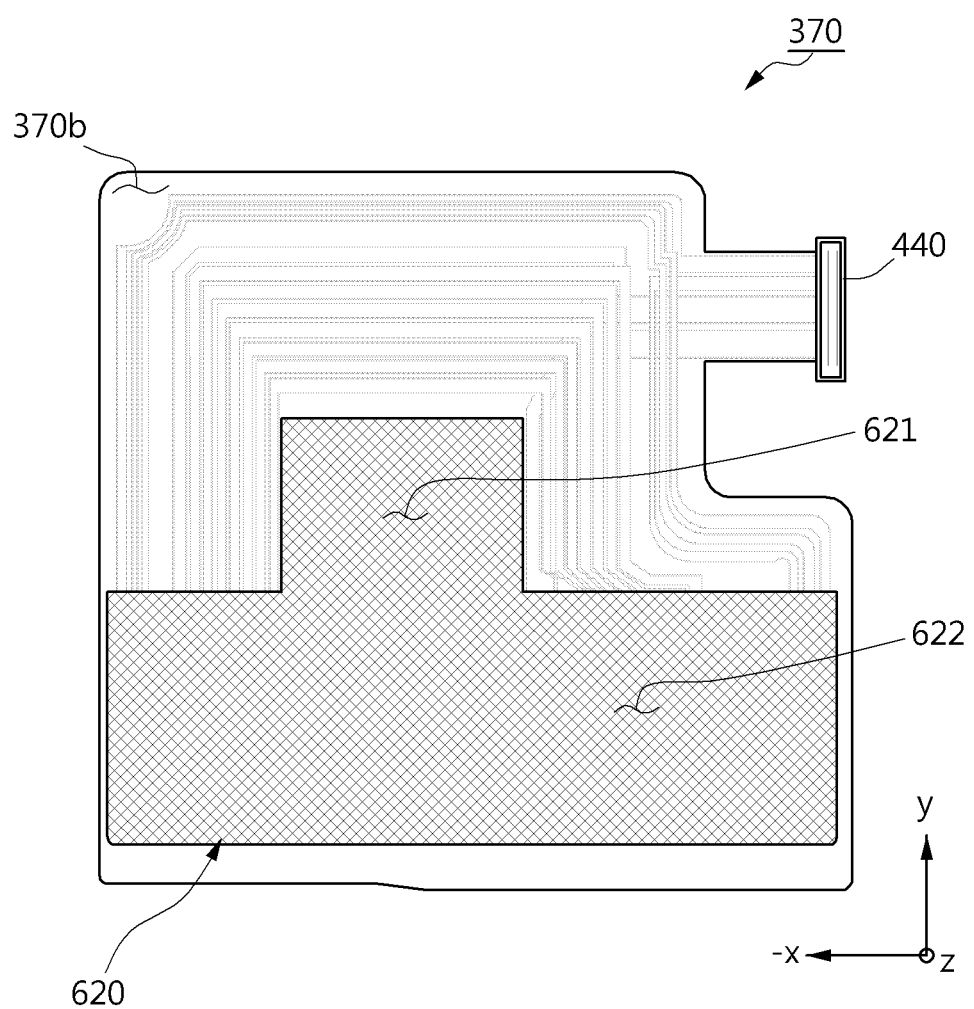
FIG. 6 is a diagram illustrating an example antenna structure and a second magnetic sheet disposed at the antenna structure according to an embodiment.

FIG. 6 is a diagram illustrating an example antenna structure 370 and a second magnetic sheet 620 disposed at the antenna structure 370 according to an embodiment.

Referring to FIGS. 4, 5 and 6, the antenna structure 370 may include a first surface 370a facing the rear plate 211 of FIG. 3 and a second surface 370b disposed at the side opposite to that of the first surface 370a and facing one surface 361a of the second support member 361. According to an embodiment, a first magnetic sheet 610 may be disposed at or attached to the first surface 370a of the antenna structure 370 (see, e.g., FIG. 4). According to an example embodiment, the second magnetic sheet 620 may be disposed at or attached to the second surface 370*b* of the antenna structure 370.

According to an embodiment, when viewed from above (e.g., when viewed in z-axis direction) the first surface 370*a* of the antenna structure 370, the first magnetic sheet 610 and the second magnetic sheet 620 may be disposed to partially overlap. For example, when viewed from above the first surface 370*a* of the antenna structure 370, the first magnetic sheet 610 and the second magnetic sheet 620 may overlap each other in the coil inner area 540 of FIG. 5. For example, the first magnetic sheet 610 may include a first portion 611 disposed in the coil inner area 540 of FIG. 5 and a second portion 612 extended from the first portion 611. The second magnetic sheet 620 may include a third portion 621 disposed in the coil inner area 540 of FIG. 5 and a fourth portion 622 extended from the third portion 621. When viewed from above the first surface 370*a* of the antenna structure 370, the first portion 611 and the third portion 621 may overlap at least partially. When viewed from above the first surface 370*a* of the antenna structure 370, the second portion 612 may be disposed between the first portion 611 and the first side portion 411. When viewed from above the first surface 370*a* of the antenna structure 370, the fourth portion 622 may be disposed between the third portion 621 and the battery 350. According to an embodiment, in a direction (e.g., in x-axis direction) between the third side portion 413 and the fourth side portion 414, the second portion 612 may have a larger width than that of the first portion 611. According to an embodiment, in x-axis direction, the fourth portion 622 may have a larger width than that of the third portion 621.

Figure 7:
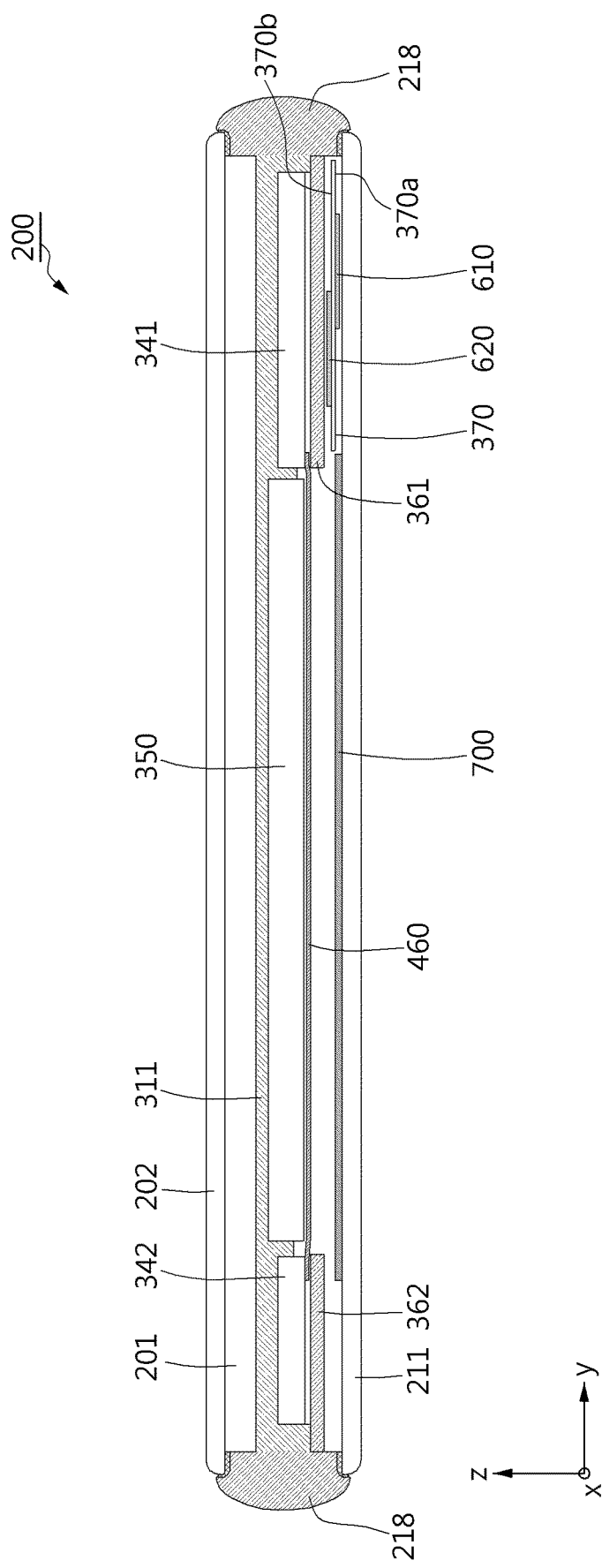
FIG. 7 is a cross-sectional view illustrating line A-A' in the electronic device of FIG. 2A according to an embodiment.

FIG. 7 is a cross-sectional view illustrating line A-A' in the electronic device of FIG. 2A according to an embodiment.

Referring to FIG. 7, in an example embodiment, the electronic device 200 may include a housing (e.g., the housing 210 of FIG. 2A) including a front plate 202, a rear plate 211, and side members 218 that form an external shape thereof, a first support member 311 disposed in an inner space of the housing, a display 201, a first substrate assembly 341, a second substrate assembly 342, a battery 350, a second electrical path 460, a second support member 361, a third support member 362, an antenna structure 370, a first magnetic sheet 610, a second magnetic sheet 620, and/or a third magnetic sheet 700.

According to an example embodiment, the second electrical path 460 may electrically connect the first substrate assembly 341 and the second substrate assembly 342. The second electrical path 460 may be disposed across, for example, between the battery 350 and the rear plate 211.

According to an embodiment, the antenna structure 370 may be disposed between the first substrate assembly 341 and the rear plate 211. The antenna structure 370 may be implemented in, for example, a film form. The antenna structure 370 may be disposed not to overlap the battery 350, when viewed from above the rear plate 211 (e.g., when viewed in +z axis direction). According to an embodiment, the antenna structure 370 may be disposed at the second support member 361 for covering at least a portion of the first substrate assembly 341.

According to an example embodiment, the antenna structure 370 may include a first surface 370*a* facing the rear plate 211 and a second surface 370*b* disposed at the side opposite to that of the first surface 370*a* and facing the second support member 361. The first magnetic sheet 610 may be disposed at the first surface 370*a* of the antenna structure 370. The second magnetic sheet 620 may be disposed at the second surface 370*b* of the antenna structure 370. According to an embodiment, when viewed from above the rear plate 211, the first magnetic sheet 610 and the second magnetic sheet 620 may partially overlap each other in the coil inner area 540 of FIG. 5.

According to an embodiment, the third magnetic sheet 700 may be disposed at the rear plate 211 between the battery 350 and the rear plate 211. Referring to FIGS. 4 and 7, when viewed from above the rear plate 211, the third magnetic sheet 700 may be disposed to overlap at least partially with the first electrical path 450 and/or the second electrical path 460. The third magnetic sheet 700 may reduce noise transfer to the first electrical path 450 and the second electrical path 460. For example, the third magnetic sheet 700 may shield noise from an external electronic device from reaching the first electrical path 450 and/or the second electrical path 460 through the rear plate 211. For example, when the electronic device 200 is mounted on a wireless charging device, the third magnetic sheet 700 may reduce an electrical impact (e.g., noise) applied to the first electrical path 450 and/or the second electrical path 460 by the wireless charging device. By noise shielding by the third magnetic sheet 700, integrity of a signal transmitted through the first electrical path 450 and/or the second electrical path 460 may be secured.

According to an embodiment, the third magnetic sheet 700 may be disposed closer to the rear plate 211 in −z direction than the second magnetic sheet 620. For example, the second magnetic sheet 620 may be disposed farther from the rear plate 211 in +z axis direction than the first magnetic sheet 610 and the third magnetic sheet 700. The third magnetic sheet 700 may be spaced apart from the first magnetic sheet 610 in −y axis direction.

According to various embodiments, the third magnetic sheet 700 may be implemented in a one-piece FPCB form with the first electrical path 450 and/or the second electrical path 460. According to various embodiments, the third magnetic sheet 700 may be attached to an FPCB including the first electrical path 450 and/or the second electrical path 460.

Figure 8:
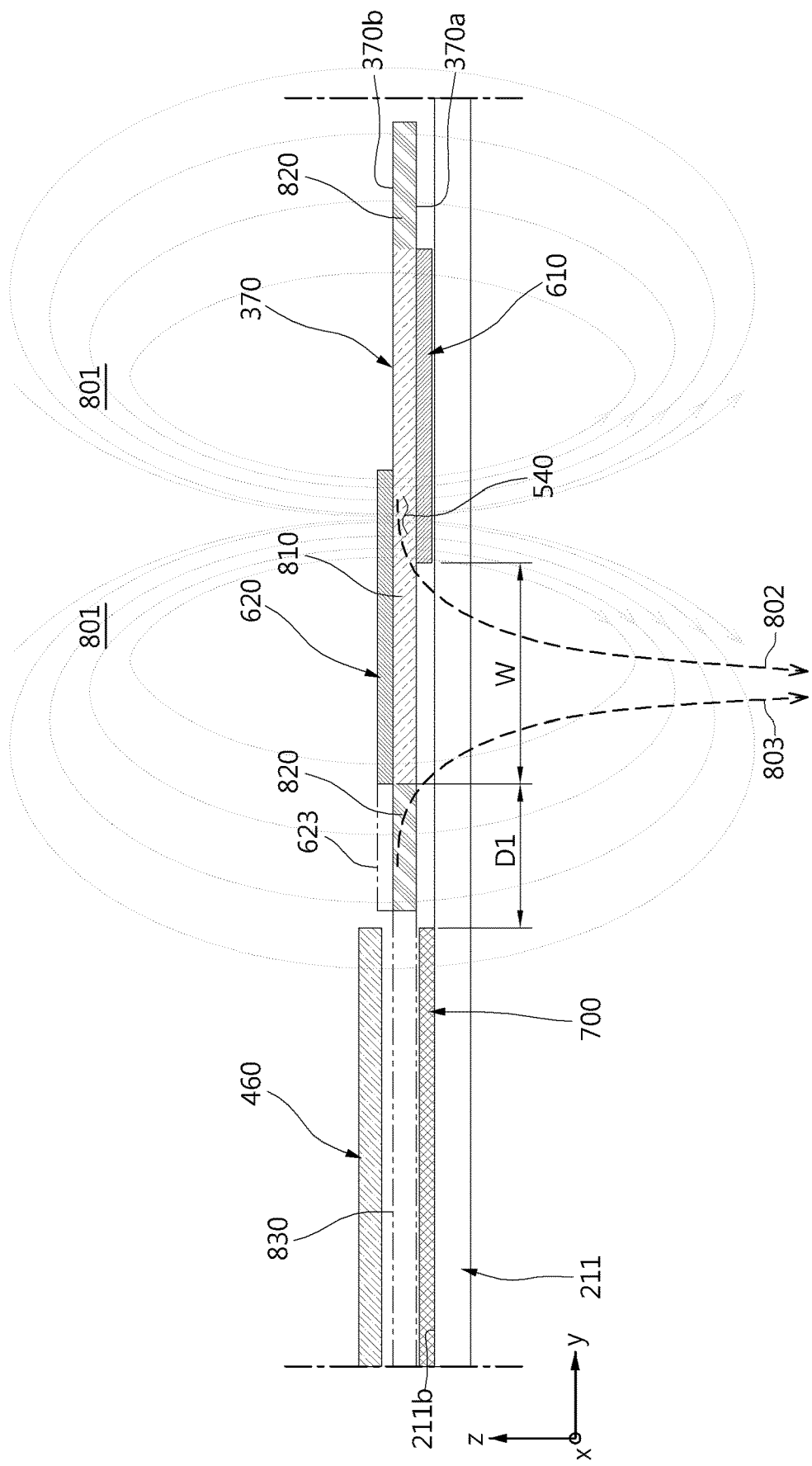
FIG. 8 is a cross-sectional view illustrating an example antenna structure in the electronic device of FIG. 7 according to an embodiment.

FIG. 8 is a cross-sectional view illustrating an example antenna structure related to the antenna structure 370 in the electronic device 200 of FIG. 7 according to an embodiment.

According to an example embodiment, the antenna structure 370 may include a first area 810 including the first conductive pattern 510 of FIG. 4 and a second area 820 including the second conductive pattern 520 of FIG. 4. The second area 820 may have a shape enclosing the first area 810, when viewed from above the rear plate 211.

According to an embodiment, the first area 810 may transmit and/or receive a first signal in a first frequency band. The second area 820 may transmit and/or receive a second signal in a second frequency band different from the first frequency band. For example, the first signal may have a frequency related to MST, and the second signal may have a frequency related to NFC.

According to an example embodiment, an antenna or an antenna system using the antenna structure 370 may include a first antenna structure in which the first magnetic sheet 610 and the second magnetic sheet 620 partially overlap, when viewed from above the rear plate 211 (e.g., when viewed in +z axis direction) while the first magnetic sheet 610 is disposed at the first surface 370*a* of the antenna structure 370 and the second magnetic sheet 620 is disposed at the second surface 370*b* of the antenna structure 370. According to the first antenna structure, the second magnetic sheet 620 may be disposed closer to the third magnetic sheet 700 in −y axis direction than the first magnetic sheet 610.

According to an example embodiment, an antenna or an antenna system using the antenna structure 370 may include a second antenna structure in which the third magnetic sheet 700 is disposed at a third surface 211*b* spaced apart from the second surface 370*b* of the antenna structure 370 toward the rear plate 211 and is spaced apart from the first magnetic sheet 610 with the second magnetic sheet 620 interposed between the first magnetic sheet 610 and the second antenna structure, when viewed from above the rear plate 211. According to the second antenna structure, when viewed from above the rear plate 211, the second magnetic sheet 620 may include one end portion (e.g., the third portion 621 of FIG. 6) partially overlapping with the first magnetic sheet 610 and the other end portion (e.g., the fourth portion 622 of FIG. 6) extended from the one end portion and adjacent to the third magnetic sheet 700. According to an example embodiment, the third surface 211*b* may be formed by the rear plate 211. According to the second antenna structure, the first magnetic sheet 610 and the third magnetic sheet 700 may be disposed closer to the rear plate 211 in −z axis direction than the second magnetic sheet 620.

According to some embodiments, the first magnetic sheet 610 may not be disposed at the antenna structure 370 but may be disposed at the rear plate 211 (e.g., the third surface 211*b*).

According to an embodiment, when viewed from above the rear plate 211, the first magnetic sheet 610 may be disposed so as not to overlap the second area 820. For example, when transmitting and/or receiving a signal of a frequency related to NFC through the second area 820, if there is a first magnetic sheet 610 between the rear plate 211 and the second area 820, a radiation performance through the second area 820 may be deteriorated because of the first magnetic sheet 610; thus, the first magnetic sheet 610 may be disposed so as not to overlap the second area 820 for NFC.

According to an example embodiment, when viewed from above the rear plate 211, the third magnetic sheet 700 may be disposed so as not to overlap the second area 820 to secure a radiation performance for NFC. For example, when transmitting and/or receiving a signal of a frequency related to NFC through the second area 820, if there is a third magnetic sheet 700 between the rear plate 211 and the second area 820, a radiation performance through the second area 820 may be deteriorated because of the third magnetic sheet 700; thus, when viewed from the rear plate 211, the third magnetic sheet 700 may be disposed so as not to overlap the second area 820 for NFC.

According to various embodiments, the second magnetic sheet 620 may be extended to overlap at least partially with the second area 820, when viewed from above the rear plate 211 (see reference numeral 623). An extended portion 623 of the second magnetic sheet 620 may shield noise. For example, noise from the first substrate assembly 341 of FIG. 7 may be shielded by the extended portion 623 to be difficult to enter the second area 820.

According to various embodiments, the spatial relationship between the second magnetic sheet 620 and the third magnetic sheet 700 may be changed by the extended portion 623. According to an example embodiment, the extended portion 623 is involved in a change in characteristics of an electromagnetic field by electromagnetic coupling between the second magnetic sheet 620 and the third magnetic sheet 700 to improve a radiation performance.

According to an example embodiment, when an electromagnetic field 801 is formed from the antenna structure 370, electromagnetic coupling between the first magnetic sheet 610 and the second magnetic sheet 620 and electromagnetic coupling between the second magnetic sheet 620 and the third magnetic sheet 700 may occur. According to an embodiment, the first antenna structure and the second antenna structure may enable electromagnetic energy emitted from the antenna structure 370 to be concentrated in a specific direction in the space to improve a radiation performance. For example, electromagnetic wave energy emitted from the antenna structure 370 may be concentrated in a direction (e.g., −z axis direction) in which the first surface 370*a* of the antenna structure 370 is substantially directed by the first antenna structure and the second antenna structure or in a direction toward the rear plate 211 or may have directionality or directivity to transmit or receive waves. For example, by forming a preset boundary condition for an electromagnetic field from the antenna structure 370 by the first antenna structure and the second antenna structure, electromagnetic wave energy may be guided in a specific direction. For example, the first antenna structure and the second antenna structure may spread radio waves emitted from the antenna structure 370. For example, because of electromagnetic coupling between the first magnetic sheet 610 and the second magnetic sheet 620, electromagnetic energy that passes through between the first magnetic sheet 610 and the second magnetic sheet 620 to be concentrated toward the rear plate 211 may be formed (see a magnetic field line 802). For example, because of electromagnetic coupling between the second magnetic sheet 620 and the third magnetic sheet 700, electromagnetic energy that passes through the second magnetic sheet 620 and the third magnetic sheet 700 to be concentrated toward the rear plate 211 may be formed (see a magnetic field line 803).

According to various embodiments, the first antenna structure and the second antenna structure may operate as a reflector that increases radiation in the maximum radiation direction.

According to an example embodiment, the first antenna structure and the second antenna structure reduce a magnetic flux reduced by a peripheral conductive medium such as the first substrate assembly 341 of FIG. 7 to secure a radiation performance of the antenna structure 370. For example, when decrease in magnetic flux reduces, electromagnetic wave energy increases because of an increase in an inductance value, thereby improving a radiation performance.

According to an example embodiment, the first antenna structure and the second antenna structure reduce a loss of electromagnetic energy because of an eddy current generated in peripheral elements (e.g., metal member or integrated circuit) such as the first substrate assembly 341 of FIG. 7, thereby securing a radiation performance of the antenna structure 370.

According to various embodiments, in a section in which the first magnetic sheet 610 and the second magnetic sheet 620 partially overlap in the coil inner area 540, a change in characteristics of the electromagnetic field because of electromagnetic coupling between the first magnetic sheet 610 and the second magnetic sheet 620 may occur.

According to an embodiment, the third magnetic sheet 700 may be disposed to be electromagnetically coupled to the second magnetic sheet 620. When viewed from above the rear plate 211, a distance D1 between the third magnetic sheet 700 and the second magnetic sheet 620 may be formed so that electromagnetic coupling between the third magnetic sheet 700 and the second magnetic sheet 620 is possible.

According to various embodiments, the distance D1 may be formed based on a wavelength of radio waves emitted from the antenna structure 370 so that the third magnetic sheet 700 and the second magnetic sheet 620 are not electromagnetically isolated.

For example, referring to FIGS. 4 and 5, when viewed from above the first surface 370a of the antenna structure 370, the coil inner area 540 may include a first boundary 540a, a second boundary 540b disposed at the side opposite to that of the first boundary 540a, a third boundary 540c connecting one end portion of the first boundary 540a and one end portion of the second boundary 540b, and a fourth boundary 540d connecting the other end portion of the first boundary 540a and the other end portion of the second boundary 540b, and disposed at the side opposite to that of the third boundary 540c. In an example embodiment, the first boundary 540a may be disposed closer to the first side portion 411 than the second boundary 540b, and the second boundary 540b may be disposed closer to the battery 350 than the first boundary 540a. The third boundary 540c may be disposed closer to the third side portion 413 than the fourth boundary 540d, and the fourth boundary 540d may be disposed closer to the fourth side portion 414 than the third boundary 540c. The first area 810 (or the first coil portion 513) may include a first pattern portion 513a between the first boundary 540a and the first side portion 411, a second pattern portion 513b between the second boundary 540b and the battery 350, a third pattern portion 513c between the third boundary 540c and the third side portion 413, or a fourth pattern portion 513d between the fourth boundary 540d and the fourth side portion 414. According to an embodiment, the second pattern portion 513b may have a first width W extended in a direction (e.g., −y axis direction) advancing from the second boundary 540b to the battery 350. For example, the first width W may refer, for example, to a width of the first coil portion 513 in −y axis direction from the coil inner area 540. According to an embodiment, referring to FIGS. 5 and 8, when viewed from above the rear plate 211, the distance D1 may be formed within a length larger by about two times than the first width W. For example, the distance D1 may be about 20 mm or less.

According to an embodiment, when the third magnetic sheet 700 is disposed substantially parallel to the second magnetic sheet 620, it may be difficult to secure a radiation performance of the antenna structure 370. The third magnetic sheet 700 and the second magnetic sheet 620 may be substantially parallel to each other and be spaced apart from each other, but such a disposition structure may result in a loss (e.g., leakage) of electromagnetic energy through electromagnetic coupling between the second magnetic sheet 620 and the third magnetic sheet 700. For example, it may be difficult that two magnetic sheets (e.g., the first magnetic sheet 610 and the third magnetic sheet 700) disposed on the same plane at electromagnetic coupling distances guide electromagnetic energy in a specific direction. According to an example embodiment, the third magnetic sheet 700 may be closer to the rear plate 211 in −z axis direction than the second magnetic sheet 620 and be spaced apart from the first magnetic sheet 610 in −y axis direction to secure a radiation performance.

According to some embodiments (not illustrated), the first magnetic sheet 610 is disposed at the first surface 370a of the antenna structure 370, and the second magnetic sheet 620 is disposed at the second surface 370b of the antenna structure 370, but may be disposed so as not to overlap each other to be electromagnetically coupled, when viewed from above the rear plate 211.

According to an example embodiment, the first magnetic sheet 610, the second magnetic sheet 620, and/or the third magnetic sheet 700 may be implemented with various magnetic materials involved in a magnetic flux or a frequency related to the antenna structure 370 to improve a radiation performance through the first antenna structure and the second antenna structure. According to various embodiments, the magnetic material may include various conductive materials and/or non-conductive materials having magnetic properties. For example, materials constituting the first magnetic sheet 610, the second magnetic sheet 620, and/or the third magnetic sheet 700 may be selected based on a frequency of signals transmitted and/or received through the first area 810. According to an embodiment, the first magnetic sheet 610, the second magnetic sheet 620, and/or the third magnetic sheet 700 may be made of a material having a relatively high dielectric constant and/or magnetic permeability at a frequency of signals transmitted and/or received through the first area 810. According to an embodiment, the first magnetic sheet 610, the second magnetic sheet 620, and/or the third magnetic sheet 700 may be made of a material having relatively high electromagnetic shielding characteristics or electromagnetic diffusion characteristics at a frequency of signals transmitted and/or received through the first area 810.

For example, the first magnetic sheet 610, the second magnetic sheet 620, and/or the third magnetic sheet 700 may be implemented into a nano sheet having a relatively high dielectric constant in a frequency (e.g., about 70 kHz) of about 200 kHz or less related to MST using the first area 810. The nano sheet may refer, for example, to a magnetic sheet formed in a thickness of about 100 um or less using a nano grain alloy. The first magnetic sheet 610, the second magnetic sheet 620, and/or the third magnetic sheet 700 may be implemented with various other materials. For example, the first magnetic sheet 610, the second magnetic sheet 620, and/or the third magnetic sheet 700 may be implemented into a nano sheet or a ferrite sheet.

According to various embodiments, at least two of the first magnetic sheet 610, the second magnetic sheet 620, and the third magnetic sheet 700 may be made of different materials.

According to various embodiments, the extended portion 623 may be implemented into a separate fourth magnetic sheet. A material forming the fourth magnetic sheet may be selected based on a frequency of a signal transmitted and/or received through the second area 820. For example, the fourth magnetic sheet may be implemented with a ferrite sheet having a relatively high dielectric constant and/or magnetic permeability at a frequency related to NFC. For example, the fourth magnetic sheet may be made of a material having relatively high electromagnetic shielding characteristics at a frequency related to NFC.

In some embodiments, referring to FIGS. 7 and 8, the first electrical path 450 and/or the second electrical path 460 electrically connecting the first substrate assembly 341 and the second substrate assembly 342 may be omitted. In this case, the antenna structure 370 may further include a portion 830 extended from the second area 820 so as to be spaced apart from the rear plate 211 with the third magnetic sheet 700 interposed between the rear plate 211 and the portion 830. According to an embodiment, the third magnetic sheet 700 may not be disposed at the rear plate 211, but may be disposed at the first surface 370a in the extended portion 830.

Figure 9:
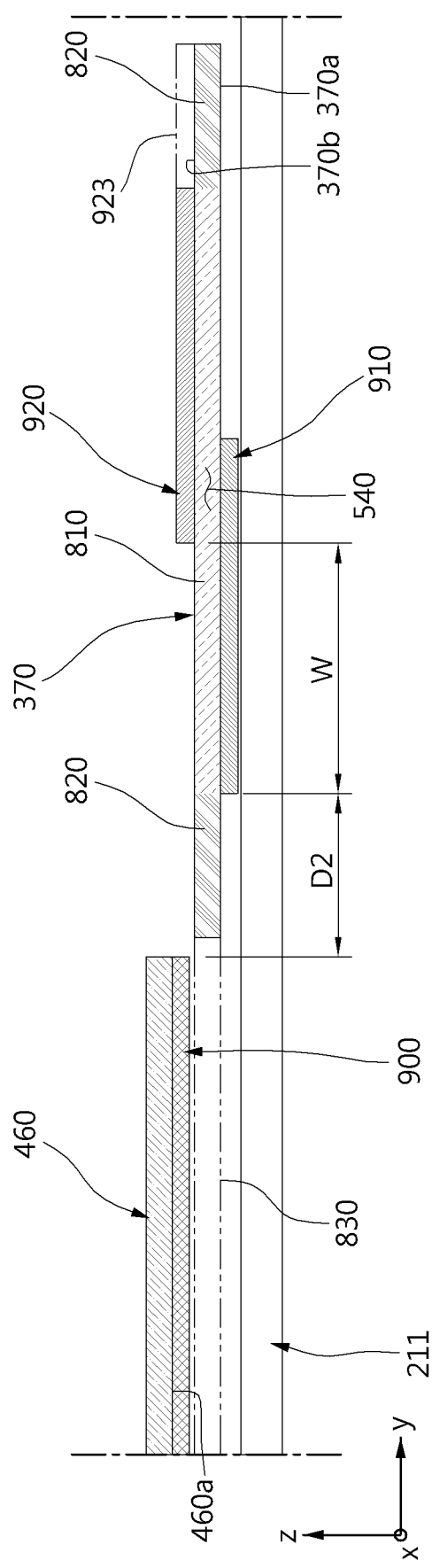
FIG. 9 is a cross-sectional view illustrating an example antenna structure according to an embodiment.

FIG. 9 is a cross-sectional view illustrating an example antenna structure 370 according to another embodiment.

According to various embodiments, a disposition structure illustrated in FIG. 9 may be applied to the electronic device 200 of FIG. 4 or 7, and some components of FIG. 4 or 7 may be omitted or may be replaced with components of FIG. 9 according to the embodiment. A coordinate axis of FIG. 9 may coincide with the coordinate axis of the electronic device 100 of FIG. 4 or 7 or may be formed differently from the coordinate axis of FIG. 4 or 7 according to a disposition structure thereof according to various embodiments. This may be equally applied to FIG. 10, 11, 12, 13, or 14.

According to an example embodiment, the antenna structure 370 may include a first area 810 including the first conductive pattern 510 of FIG. 4 and a second area 820 including the second conductive pattern 520 of FIG. 4. The second area 820 may have a shape enclosing the first area 810, when viewed from above the rear plate 211. The first area 810 may transmit and/or receive a first signal in the first frequency band. The second area 820 may transmit and/or receive a second signal in a second frequency band different from the first frequency band. For example, the first signal may have a frequency related to MST, and the second signal may have a frequency related to NFC.

According to an example embodiment, an antenna or an antenna system using the antenna structure 370 may include a third antenna structure in which a first magnetic sheet 910 and a second magnetic sheet 920 partially overlap, when viewed from above the rear plate 211 while the first magnetic sheet 910 is disposed at the first surface 370a of the antenna structure 370 and the second magnetic sheet 920 is disposed at the second surface 370b of the antenna structure 370. According to the third antenna structure, the first magnetic sheet 910 may be disposed closer to the third magnetic sheet 900 than the second magnetic sheet 920 in −y axis direction.

According to an example embodiment, an antenna or an antenna system using the antenna structure 370 may include a fourth antenna structure in which the third magnetic sheet 900 is disposed at a third surface 460a separated from the first surface 370a of the antenna structure 370 toward the front plate 202 (see FIG. 7) and is spaced apart from the second magnetic sheet 920 with the first magnetic sheet 910 interposed therebetween, when viewed from above the rear plate 211. According to the fourth antenna structure, when viewed from above the rear plate, the first magnetic sheet 910 may include one end portion (e.g., a first portion 611 of FIG. 4) partially overlapped with the second magnetic sheet 920 and the other end portion (e.g., a second portion 612 of FIG. 4) extended from the one end portion and adjacent to the third magnetic sheet 900. According to an example embodiment, the third surface 460a may be formed by the electrical path 460. According to the fourth antenna structure, the first magnetic sheet 910 may be disposed closer to the rear plate 211 in −z axis direction than the second magnetic sheet 920 and the third magnetic sheet 900.

According to some embodiments, the first magnetic sheet 910 may not be disposed at the antenna structure 370 but may be disposed at the rear plate 211 (e.g., the third surface 211b).

According to an embodiment, when viewed from above the rear plate 211, the first magnetic sheet 910 may be disposed so as not to overlap the second area 820. For example, when transmitting and/or receiving a signal of a frequency related to NFC through the second area 820, if there is a first magnetic sheet 910 between the rear plate 211 and the second area 820, a radiation performance through the second area 820 may be deteriorated because of the first magnetic sheet 910; thus, the first magnetic sheet 910 may be disposed so as to not overlap the second area 820 for NFC.

According to various embodiments, the second magnetic sheet 920 may be extended to overlap at least partially with the second area 820, when viewed from above the rear plate 211 (see reference numeral 923). An extended portion 923 of the second magnetic sheet 920 may shield noise. For example, noise from the first substrate assembly 341 of FIG. 7 may be shielded by the extended portion 923 to be difficult to enter the second area 820.

According to an embodiment, the third antenna structure and the fourth antenna structure illustrated in the embodiment of FIG. 9 may perform substantially the same functions as those of the first antenna structure and the second antenna structure illustrated in the embodiment of FIG. 8 to improve a radiation performance of the antenna structure 370. According to an example embodiment, when an electromagnetic field is formed by the antenna structure 370, electromagnetic coupling between the first magnetic sheet 910 and the second magnetic sheet 920 and electromagnetic coupling between the first magnetic sheet 910 and the third magnetic sheet 900 may occur. According to an embodiment, the third antenna structure and the fourth antenna structure may enable electromagnetic energy emitted from the antenna structure 370 to be concentrated in a specific direction in the space to improve a radiation performance. For example, electromagnetic wave energy emitted from the antenna structure 370 may be concentrated in a direction (e.g.: −z axis direction) in which the first surface 370a of the antenna structure 370 is substantially directed by the third antenna structure and the fourth antenna structure, or in a direction toward the rear plate 211 or may have directionality or directivity to transmit or receive waves. For example, by forming a preset boundary condition for an electromagnetic field from the antenna structure 370 by the third antenna structure and the fourth antenna structure, electromagnetic wave energy may be guided in a specific direction.

According to an embodiment, the third magnetic sheet 900 may be disposed to be electromagnetically coupled to the first magnetic sheet 910. When viewed from above the rear plate 211, a distance D2 between the third magnetic sheet 900 and the first magnetic sheet 910 may be formed so that electromagnetic coupling between the third magnetic sheet 900 and the first magnetic sheet 910 is possible. According to various embodiments, the distance D2 may be formed based on a wavelength of radio waves emitted from the antenna structure 370 so that the third magnetic sheet 900 and the first magnetic sheet 910 are not electromagnetically isolated.

According to an embodiment, referring to FIGS. 5 and 9, the distance D2 may be formed within a length larger by about two times than the first width W in which the second pattern portion 513b between the first area 810 or the second boundary 540b of the first coil portion 513 and the battery 350 has in y-axis direction, when viewed from above the rear plate 211. For example, the distance D2 may be about 20 mm or less.

According to an embodiment, when the third magnetic sheet 900 is disposed substantially parallel to the first magnetic sheet 910, it may be difficult that a radiation performance of the antenna structure 370 is secured. The third magnetic sheet 900 and the first magnetic sheet 910 may be substantially parallel to each other and be spaced apart from each other, but such a disposition structure may occur a loss (e.g., leakage) of electromagnetic energy through electromagnetic coupling between the first magnetic sheet 910 and the third magnetic sheet 900. According to an example embodiment, the third magnetic sheet 900 may be closer to the front plate 202 (see FIG. 7) in −z axis direction than the first magnetic sheet 910 and be spaced apart from the second magnetic sheet 920 in −y axis direction to secure a radiation performance.

In some embodiments, an electrical path 460 may be omitted. In this case, the antenna structure 370 may further include a portion 830 extended to be spaced apart from the rear plate 211 with the third magnetic sheet 900 interposed therebetween. According to an example embodiment, the third magnetic sheet 900 may be disposed at the first surface 370*a* in the extended portion 830.

According to an example embodiment, the first magnetic sheet 910, the second magnetic sheet 920, and/or the third magnetic sheet 900 may be implemented with various magnetic materials involved in a magnetic flux or a frequency related to the antenna structure 370 to improve a radiation performance through the third antenna structure and the fourth antenna structure. According to an embodiment, the third antenna structure and the fourth antenna structure illustrated in the embodiment of FIG. 9 may be different in the spatial relationship between the first antenna structure and the second antenna structure and the plurality of magnetic sheets illustrated in the embodiment of FIG. 8, and the magnetic sheet of FIG. 9 (e.g., the first magnetic sheet 910, the second magnetic sheet 920, and/or the third magnetic sheet 900) may be implemented with substantially the same material as that of the magnetic sheet (e.g., the first magnetic sheet 610, the second magnetic sheet 620, and/or the third magnetic sheet 700) of FIG. 8.

Figure 10:
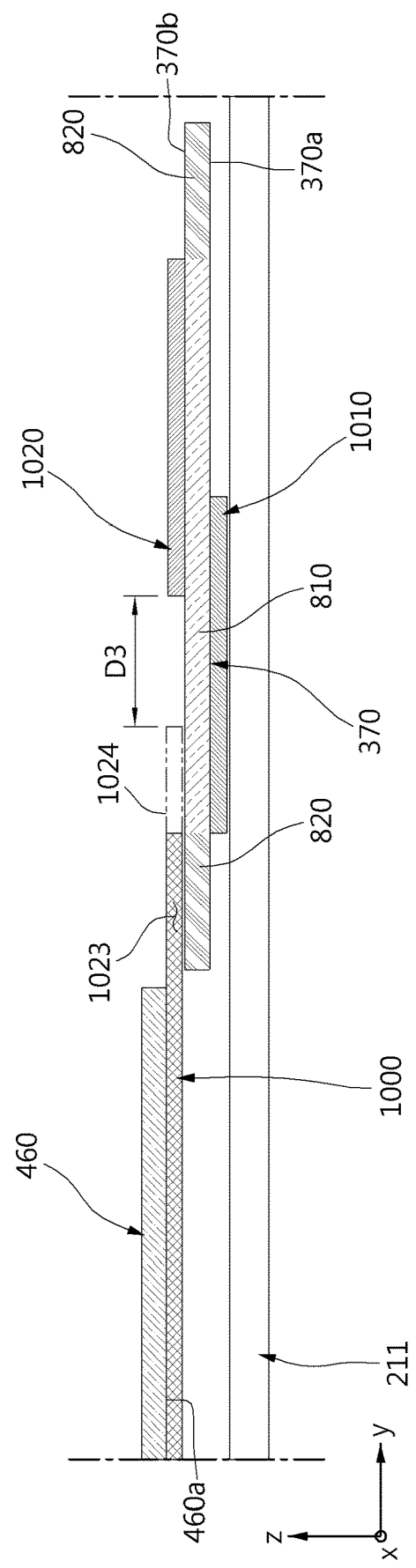
FIG. 10 is a cross-sectional view illustrating an example antenna structure according to an embodiment.

FIG. 10 is a cross-sectional view illustrating an example antenna structure 370 according to an embodiment.

According to various embodiments, a disposition structure illustrated in FIG. 10 may be applied to the electronic device 200 of FIG. 4 or 7, and some components of FIG. 4 or 7 may be omitted or may be replaced with components of FIG. 10 according to the embodiment.

Referring to FIG. 10, an antenna or an antenna system using the antenna structure 370 may include a fifth antenna structure in which a first magnetic sheet 1010 and a second magnetic sheet 1020 partially overlap, when viewed from above the rear plate 211 while the first magnetic sheet 1010 (e.g., the first magnetic sheet 910 of FIG. 9) is disposed at a first surface 370*a* of the antenna structure 370 and the second magnetic sheet 1020 (e.g., the second magnetic sheet 920 of FIG. 9) is disposed at the second surface 370*b* of the antenna structure 370. An antenna or an antenna system using the antenna structure 370 may include a sixth antenna structure in which a third magnetic sheet 1000 is disposed closer (e.g., the third surface 460*a*) to the front plate 202 (see FIG. 7) in +z axis direction than the first magnetic sheet 1010 and is spaced apart from the second magnetic sheet 1020 in −y axis direction with the first magnetic sheet 1010 interposed therebetween, when viewed from above the rear plate 211. According to the sixth antenna structure, when viewed from above the rear plate 211, the first magnetic sheet 1010 may include one end portion (e.g., the first portion 611 of FIG. 4) that partially overlaps with the second magnetic sheet 1020 and the other end portion (e.g., the second portion 612 of FIG. 4) extended from the one end portion and adjacent to the third magnetic sheet 1000. According to an example embodiment, the third surface 460*a* may be formed by the electrical path 460. According to the sixth antenna structure, the first magnetic sheet 910 may be disposed closer to the rear plate 211 in −y axis direction than the second magnetic sheet 920 and the third magnetic sheet 900.

According to various embodiments, compared to the embodiment of FIG. 9, the third magnetic sheet 1000 may partially cover the second surface 370*b* of the antenna structure 370 to be extended to overlap the second area 820 of the antenna structure 370, when viewed from above the rear plate 211. For example, the third surface 460*a* in which the third magnetic sheet 1000 is disposed may be disposed farther than the rear plate 211 in +z axis direction than the first surface 370*a* in which the first magnetic sheet 1000 is disposed. According to various embodiments, an extended portion 1023 may shield noise. For example, noise from the first substrate assembly 341 of FIG. 7 may be shielded by the extended portion 1023 to be difficult to enter the second area 820.

According to various embodiments, the spatial relationship between the first magnetic sheet 1010 and the third magnetic sheet 1000 may be changed by the extended portion 1023. The extended portion 1023 may participate in a change in characteristics of an electromagnetic field by electromagnetic coupling between the first magnetic sheet 1010 and the third magnetic sheet 1000 to improve a radiation performance.

According to various embodiments, the third magnetic sheet 1000 may be further extended to overlap a portion of the first area 810 of the antenna structure 370, when viewed from above the rear plate 211 (see reference numeral 1024). When viewed from above the rear plate 211, the first magnetic sheet 1010 and the third magnetic sheet 1000 may partially overlap by the extended portion 1024. The extended portion 1024 may participate in a change in characteristics of an electromagnetic field by electromagnetic coupling between the first magnetic sheet 1010 and the third magnetic sheet 1000 to improve a radiation performance. According to an example embodiment, when viewed from above the rear plate 211, a distance D3 between the extended portion 1024 and the second magnetic sheet 1020 may be formed so that the second magnetic sheet 1020 and the third magnetic sheet 1000 are electromagnetically isolated. When the second magnetic sheet 1020 and the third magnetic sheet 1000 are not electromagnetically isolated, a loss (e.g., leakage) of electromagnetic energy may occur through electromagnetic coupling between the second magnetic sheet 1020 and the third magnetic sheet 1000. For example, the second magnetic sheet 1020 and the third magnetic sheet 1000 may be disposed substantially parallel in y-axis direction and be spaced apart from each other. It may be difficult that the two magnetic sheets 1020 and 1000 disposed at substantially parallel and electromagnetically coupled distances guide electromagnetic energy in a specific direction. According to an embodiment, the distance D3 may be formed based on a wavelength of radio waves emitted from the antenna structure 370.

Figure 11:
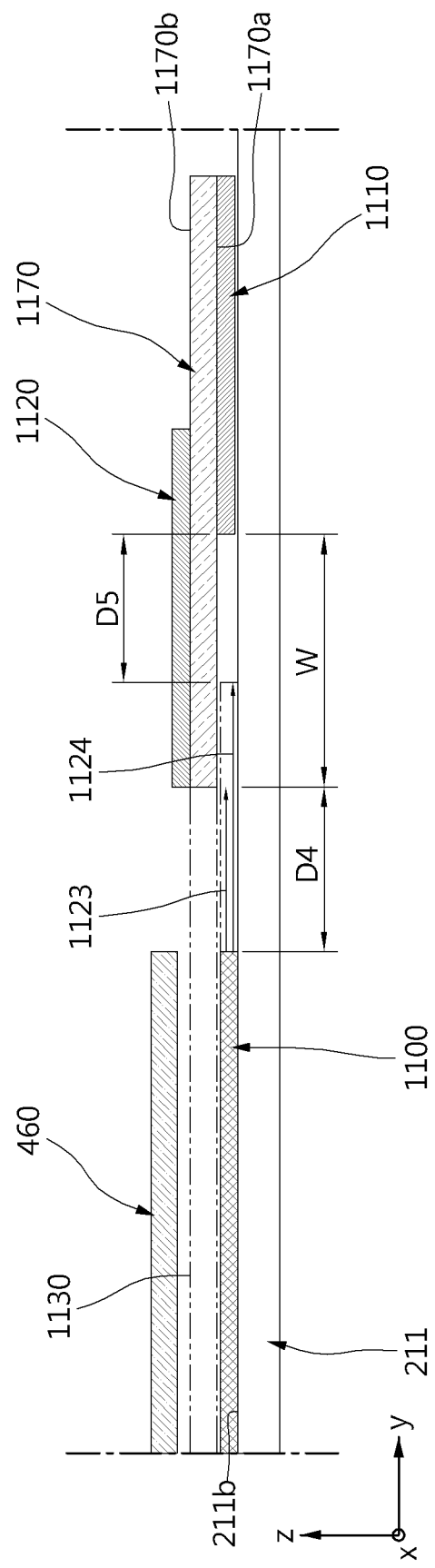
FIG. 11 is a cross-sectional view illustrating an example antenna structure according to various embodiments.

FIG. 11 is a cross-sectional view illustrating an example antenna structure 1170 according to various embodiments.

According to various embodiments, a disposition structure illustrated in FIG. 11 may be applied to the electronic device 200 of FIG. 4 or 7, and some components of FIG. 4 or 7 may be omitted or may be replaced with components of FIG. 11 according to the embodiment.

According to an embodiment, the antenna structure 1170 may be implemented in the form in which the second area 820 is omitted in the antenna structure 370 of FIG. 8. For example, the antenna structure 1170 may have the form of an FPCB including the first conductive pattern 510 of FIG.

5. According to an example embodiment, the antenna structure 1170 may transmit and/or receive a signal of a frequency related to MST.

According to an example embodiment, an antenna or an antenna system using the antenna structure 1170 may include a seventh antenna structure in which a first magnetic sheet 1110 and a second magnetic sheet 1120 partially overlap, when viewed from above the rear plate 211 while the first magnetic sheet 1110 (e.g., the first magnetic sheet 610 of FIG. 8) is disposed at a first surface 1170*a* (e.g., the first surface 310*a* of FIG. 8) of the antenna structure 1170 and the second magnetic sheet 1120 (e.g., the second magnetic sheet 620 of FIG. 8) is disposed at a second surface 1170*b* (e.g., the second surface 310*b* of FIG. 8) of the antenna structure 1170. According to the seventh antenna structure, the second magnetic sheet 1120 may be disposed closer to the third magnetic sheet 1100 in −y axis direction than the first magnetic sheet 1110.

According to an example embodiment, an antenna or an antenna system using the antenna structure 1170 may include an eighth antenna structure in which the third magnetic sheet 1100 is disposed closer (e.g., the third surface 211*b*) to the rear plate 211 in −z axis direction than the second surface 1170*b* of the antenna structure 1170 and is spaced apart in −y axis direction from the first magnetic sheet 1110 with the second magnetic sheet 1120 interposed therebetween, when viewed from above the rear plate 211. According to the eighth antenna structure, the second magnetic sheet 1120 may include one end portion (e.g., the third portion 621 of FIG. 6) partially overlapped with the first magnetic sheet 1110 and the other end portion (e.g., the fourth portion 622 of FIG. 6) extended from the one end portion and adjacent to the third magnetic sheet 1100, when viewed from above the rear plate. According to an example embodiment, the third surface 211*b* may be formed by the rear plate 211. According to the eighth antenna structure, the first magnetic sheet 1110 and the third magnetic sheet 1100 may be disposed closer to the rear plate 211 in −z axis direction than the second magnetic sheet 1120.

According to some embodiments, the first magnetic sheet 1110 may not be disposed at the antenna structure 1170, but may be disposed at the rear plate 211.

According to an embodiment, the seventh antenna structure and the eighth antenna structure illustrated in the embodiment of FIG. 11 may perform substantially the same functions as those of the first antenna structure and the second antenna structure illustrated in the embodiment of FIG. 8 to improve a radiation performance of the antenna structure 1170. According to an embodiment, when an electromagnetic field is formed from the antenna structure 1170, electromagnetic coupling between the first magnetic sheet 1110 and the second magnetic sheet 1120 and electromagnetic coupling between the first magnetic sheet 1110 and the third magnetic sheet 1100 may occur.

According to an embodiment, the seventh antenna structure and the eighth antenna structure may enable electromagnetic energy emitted from the antenna structure 1170 to be concentrated in a specific direction in the space to improve a radiation performance. For example, electromagnetic wave energy emitted from the antenna structure 1170 may be concentrated in a direction (e.g.: −z axis direction) in which the first surface 1170*a* of the antenna structure 1170 is substantially directed by the seventh antenna structure and the eighth antenna structure or in a direction toward the rear plate 211 or may have directionality or directivity to transmit or receive waves. For example, by forming a preset boundary condition for an electromagnetic field from the antenna structure 1170 by the seventh antenna structure and the eighth antenna structure, electromagnetic wave energy may be guided in a specific direction.

According to an embodiment, the third magnetic sheet 1100 may be disposed to be electromagnetically coupled to the second magnetic sheet 1120. When viewed from above the rear plate 211, a distance D4 between the third magnetic sheet 1100 and the second magnetic sheet 1120 may be formed so that electromagnetic coupling between the third magnetic sheet 1100 and the second magnetic sheet 1120 is possible. According to various embodiments, the distance D4 may be formed based on a wavelength of radio waves emitted from the antenna structure 1170 so that the third magnetic sheet 1100 and the second magnetic sheet 1120 are not electromagnetically isolated.

According to an embodiment, referring to FIGS. 5 and 11, the distance D4 may be formed within a length larger by about two times than the first width W in which the second pattern portion 513*b* between the second boundary 540*b* of the first coil portion 513 and the battery 350 has in y-axis direction, when viewed from above the rear plate 211. For example, the distance D4 may be about 20 mm or less.

According to various embodiments, the third magnetic sheet 1100 may be extended in a range that does not overlap the second magnetic sheet 1120, when viewed from above the rear plate 211 (see reference numeral 1123). According to various embodiments, when viewed from above the rear plate 211, the third magnetic sheet 1100 may be extended to be spaced apart from the first magnetic sheet 1110 while partially overlapping the second magnetic sheet 1120 (see reference numeral 1124). The spatial relationship between the first magnetic sheet 1110 and the third magnetic sheet 1100 may be changed, for example, by the extended portion 1123 or 1124. The extended portion 1123 or 1124 may participate in a change in characteristics of an electromagnetic field by electromagnetic coupling between the second magnetic sheet 1120 and the third magnetic sheet 1100 to improve a radiation performance.

According to various embodiments, when the third magnetic sheet 1100 is extended as indicated by reference numeral 1124, a distance D5 between the extended portion 1124 and the first magnetic sheet 1110 may be formed so that the first magnetic sheet 1110 and the third magnetic sheet 1100 are electromagnetically isolated. When the first magnetic sheet 1110 and the third magnetic sheet 1100 are not electromagnetically isolated, a loss (e.g., leakage) of electromagnetic energy may occur through electromagnetic coupling between the first magnetic sheet 1110 and the third magnetic sheet 1100. For example, the first magnetic sheet 1110 and the third magnetic sheet 1100 may be disposed substantially parallel and spaced apart from each other. It may be difficult that the two magnetic sheets 1110 and 1100 disposed at substantially parallel and electromagnetically coupled distances guide electromagnetic energy in a specific direction. According to an embodiment, the distance D5 may be formed based on a wavelength of radio waves emitted from the antenna structure 1170.

In some embodiments, the electrical path 460 may be omitted. In this case, the antenna structure 1170 may further include a portion 1130 extended to be spaced apart from the rear plate 211 with the third magnetic sheet 1100 interposed therebetween. According to an embodiment, the third magnetic sheet 1100 may be disposed at the first surface 1170*a* in the extended portion 1130.

According to an example embodiment, the first magnetic sheet 1110, the second magnetic sheet 1120, and/or the third magnetic sheet 1100 may be implemented with various magnetic materials (e.g., nano sheet or ferrite sheet) involved in a magnetic flux or a frequency related to the antenna structure 1170 to improve a radiation performance through the seventh antenna structure and the eighth antenna structure.

Figure 12:
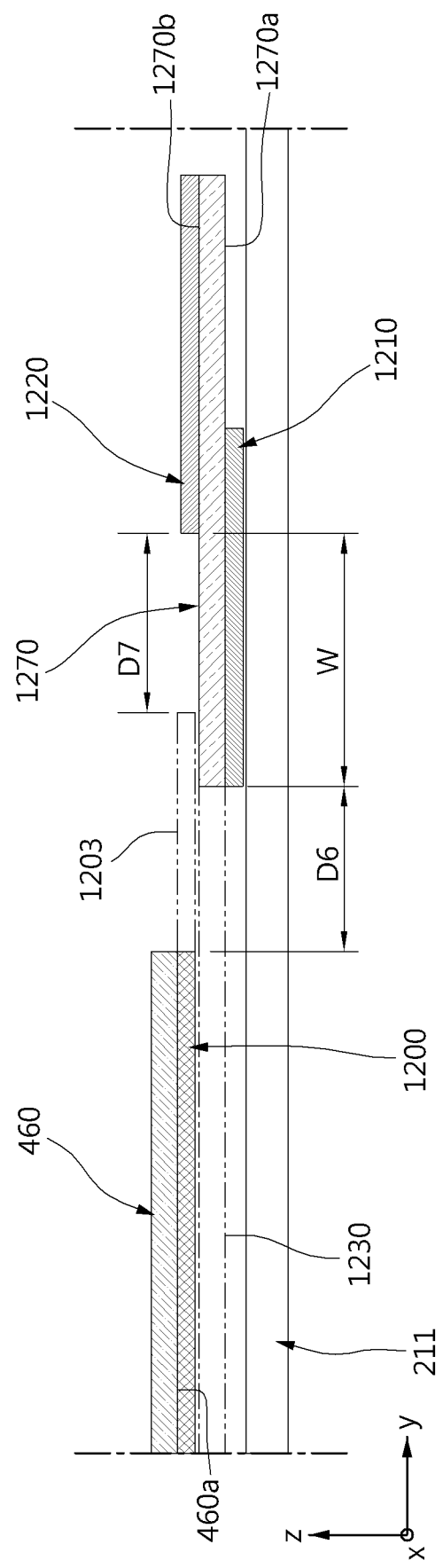
FIG. 12 is a cross-sectional view illustrating an example antenna structure according to various embodiments.

FIG. 12 is a cross-sectional view illustrating an example antenna structure 1270 according to various embodiments.

According to various embodiments, a disposition structure illustrated in FIG. 12 may be applied to the electronic device 200 of FIG. 4 or 7, and some components of FIG. 4 or 7 may be omitted or may be replaced with components of FIG. 12 according to the embodiment.

According to an embodiment, the antenna structure 1270 may be implemented in the form in which the second area 820 is omitted from the antenna structure 370 of FIG. 8. For example, the antenna structure 1270 may have the form of an FPCB including the first conductive pattern 510 of FIG. 5. According to an embodiment, the antenna structure 1270 may transmit and/or receive a signal of a frequency related to MST.

According to an example embodiment, an antenna or an antenna system using the antenna structure 1270 may include a ninth antenna structure in which the first magnetic sheet 1210 and the second magnetic sheet 1220 partially overlap, when viewed from above the rear plate 211 while the first magnetic sheet 1210 is disposed at a first surface 1270a of the antenna structure 1270 and the second magnetic sheet 1220 is disposed at a second surface 1270b of the antenna structure 1270. According to the ninth antenna structure, the first magnetic sheet 1210 may be disposed closer to the third magnetic sheet 1200 in −y axis direction than the second magnetic sheet 1220.

According to an example embodiment, an antenna or an antenna system using the antenna structure 1270 may include a tenth antenna structure in which the third magnetic sheet 1200 is disposed closer (e.g., the third surface 460a) to the front plate 202 (see FIG. 7) in +z axis direction than the first surface 1270a of the antenna structure 1270 and is spaced apart from the second magnetic sheet 1220 in −y axis direction with the first magnetic sheet 1210 interposed therebetween, when viewed from above the rear plate 211. According to the tenth antenna structure, the first magnetic sheet 1210 may include one end portion (e.g., the first portion 611 of FIG. 4) partially overlapping with the second magnetic sheet 1220 and the other end portion (e.g., the second portion 612 of FIG. 4) extended from the one end portion to be adjacent to the third magnetic sheet 1200, when viewed from above the rear plate 211. According to an example embodiment, the third surface 460a may be formed by the electrical path 460. According to the tenth antenna structure, the first magnetic sheet 1210 may be disposed closer to the rear plate 211 in −z axis direction than the second magnetic sheet 1220 and the third magnetic sheet 1200.

According to some embodiments, the first magnetic sheet 1210 may not be disposed at the antenna structure 1270, but may be disposed at the rear plate 211.

According to an embodiment, the ninth antenna structure and the tenth antenna structure illustrated in the embodiment of FIG. 12 may perform substantially the same functions as those of the third antenna structure and the fourth antenna structure illustrated in the embodiment of FIG. 9 to improve a radiator performance of the antenna structure 1270. According to an example embodiment, when an electromagnetic field is formed from the antenna structure 1270, electromagnetic coupling between the first magnetic sheet 1210 and the second magnetic sheet 1220 and electromagnetic coupling between the first magnetic sheet 1210 and the third magnetic sheet 1200 may occur.

According to an embodiment, the ninth antenna structure and the tenth antenna structure may enable electromagnetic energy emitted from the antenna structure 1270 to be concentrated in a specific direction in the space to improve a radiation performance. For example, electromagnetic wave energy emitted from the antenna structure 1270 may be concentrated in a direction (e.g., −z axis direction) in which a first surface 1270a of the antenna structure 1270 is substantially directed by the ninth antenna structure and the tenth antenna structure or in a direction toward the rear plate 211 or may have directionality or directivity to transmit or receive waves. For example, by forming a preset boundary condition for an electromagnetic field from the antenna structure 1270 by the ninth antenna structure and the tenth antenna structure, electromagnetic wave energy may be guided in a specific direction.

According to an embodiment, the third magnetic sheet 1200 may be disposed to be electromagnetically coupled to the first magnetic sheet 1210. When viewed from above the rear plate 211, a distance D6 between the third magnetic sheet 1200 and the first magnetic sheet 1210 may be formed so that electromagnetic coupling between the third magnetic sheet 1200 and the first magnetic sheet 1210 is possible. According to various embodiments, the distance D6 may be formed based on a wavelength of radio waves emitted from the antenna structure 1270 so that the third magnetic sheet 1200 and the first magnetic sheet 1210 are not electromagnetically isolated.

According to an embodiment, referring to FIGS. 5 and 12, when viewed from above the rear plate 211, the distance D6 may be formed within a length larger by about two times than the first width W in which the second pattern portion 513b between the battery 350 and a second boundary 540b of the first coil portion 513 has in a y-axis direction. For example, the distance D2 may be about 20 mm or less.

According to various embodiments, when viewed from above the rear plate 211, the third magnetic sheet 1200 may partially cover the second surface 1270b of the antenna structure 1270 to be extended to partially overlap the first magnetic sheet 1210 (see reference numeral 1203). The spatial relationship between the first magnetic sheet 1210 and the third magnetic sheet 1200 may be changed, for example, by the extended portion 1203. The extended portion 1203 may participate in a change in characteristics of an electromagnetic field by electromagnetic coupling between the first magnetic sheet 1210 and the third magnetic sheet 1200 to improve a radiation performance. According to an example embodiment, when viewed from above the rear plate 211, a distance D7 between the extended portion 1203 and the second magnetic sheet 1220 may be formed so that the second magnetic sheet 1220 and the third magnetic sheet 1200 are electromagnetically isolated. When the second magnetic sheet 1220 and the third magnetic sheet 1200 are not electromagnetically isolated, a loss (e.g., leakage) of electromagnetic energy may occur through electromagnetic coupling between the second magnetic sheet 1220 and the third magnetic sheet 1200. For example, it may be difficult that the two magnetic sheets 1220 and 1200 disposed at substantially parallel and electromagnetically coupled distances guide electromagnetic energy in a particular direction. According to an embodiment, the distance D7 may be formed based on a wavelength of radio waves emitted from the antenna structure 1270.

In some embodiments, an electrical path 460 may be omitted. In this case, the antenna structure 1270 may further include a portion 1230 extended to be spaced apart from the rear plate 211 with the third magnetic sheet 1200 interposed therebetween. According to an embodiment, the third magnetic sheet 1200 may be disposed at the first surface 1270a in the extended portion 1230.

According to an example embodiment, the first magnetic sheet 1210, the second magnetic sheet 1220, and/or the third magnetic sheet 1200 may be implemented with various magnetic materials (e.g., nano sheet or ferrite sheet) involving in a magnetic flux or a frequency related to the antenna structure 1270 to improve a radiation performance through the first antenna structure and the second antenna structure.

Figure 13:
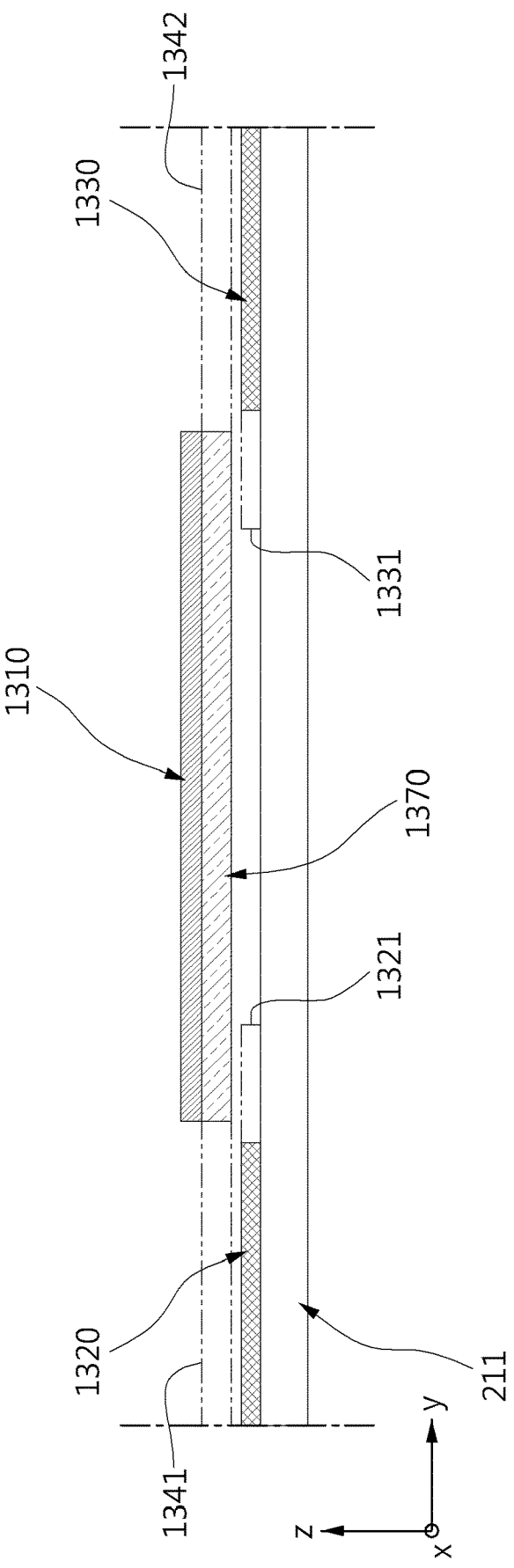
FIG. 13 is a cross-sectional view illustrating an example antenna structure according to various embodiments.

FIG. 13 is a cross-sectional view illustrating an example antenna structure 1370 according to various embodiments.

According to various embodiments, a disposition structure illustrated in FIG. 13 may be applied to the electronic device 200 of FIG. 4 or 7, and some components of FIG. 4 or 7 may be omitted or may be replaced with the components of FIG. 13 according to the embodiment.

According to an embodiment, the antenna structure 1370 may be implemented in the form in which the second area 820 is omitted from the antenna structure 370 of FIG. 8. For example, the antenna structure 1370 may have the form of an FPCB including the first conductive pattern 510 of FIG. 5. According to an embodiment, the antenna structure 1370 may transmit and/or receive a signal related to power.

According to an embodiment, a first magnetic sheet 1310 may be disposed at the antenna structure 1370. A second magnetic sheet 1320 and a third magnetic sheet 1330 may be disposed at the rear plate 211. For example, the first magnetic sheet 1310 may be disposed at one surface of the antenna structure 1370 spaced apart from the rear plate 211 in +z axis direction.

According to various embodiments, the second magnetic sheet 1320 and the third magnetic sheet 1330 may be implemented into an integral sheet. According to various embodiments, the first conductive pattern 510 of FIG. 5 included in the antenna structure 1370 may be implemented in a circular coil shape or a rectangular coil shape. For example, when the first conductive pattern 510 is in the form of a circular coil, when viewed from above the rear plate 211, the first magnetic sheet 1310 may be circular. As another example, when the first conductive pattern 510 is in the form of a square coil, the first magnetic sheet 1310 may be square. The second magnetic sheet 1320 and the third magnetic sheet 1330 may be implemented in an integral ring shape.

According to various embodiments, the second magnetic sheet 1320 and the third magnetic sheet 1330 may be physically separated from each other. For example, at least a portion of the second magnetic sheet 1320 and at least a portion of the third magnetic sheet 1330 may be disposed at both sides with the first magnetic sheet 1310 interposed therebetween, when viewed from above the rear plate 211. The antenna structure 370 may be implemented, for example, in the form in which the second conductive pattern 520 is omitted from the antenna structure 370 of FIG. 5. In an example embodiment, referring to FIGS. 5 and 13, at least a portion of the second magnetic sheet 1320 may be spaced apart from the coil inner area 540 with the first pattern portion 513a interposed therebetween, and at least a portion of the third magnetic sheet 1330 may be spaced apart from the coil inner area 540 with the second pattern portion 513b interposed therebetween. In another embodiment, referring to FIGS. 5 and 13, at least a portion of the second magnetic sheet 1320 may be spaced apart from the coil inner area 540 with the third pattern portion 513c interposed therebetween, and at least a portion of the third magnetic sheet 1330 may be spaced apart from the coil inner area 540 with the fourth pattern portion 513d interposed therebetween.

According to an example embodiment, when an electromagnetic field is formed from the antenna structure 1370, electromagnetic coupling between the first magnetic sheet 1310 and the second magnetic sheet 1320 and electromagnetic coupling between the first magnetic sheet 1310 and the third the magnetic sheet 1330 may occur. The second magnetic sheet 1320 and the third magnetic sheet 1330 may be disposed to be electromagnetically coupled to the first magnetic sheet 1310.

According to an example embodiment, an antenna or an antenna system using the antenna structure 1370 may include an antenna structure in which the first magnetic sheet 1310 is disposed farther from the rear plate 211 in +z axis direction than the second magnetic sheet 1320 and the third magnetic sheet 1330. According to an embodiment, the antenna structure may enable electromagnetic energy emitted from the antenna structure 1370 to be concentrated in a specific direction in the space to improve a radiation performance. For example, electromagnetic energy emitted from the antenna structure 1370 may be substantially concentrated in a direction toward the rear plate 211 by the antenna structure, or may have directionality or directivity capable of transmitting or receiving waves. For example, by forming a preset boundary condition for an electromagnetic field from the antenna structure 1370 by the antenna structure, electromagnetic wave energy may be guided in a specific direction.

According to various embodiments, when viewed from above the rear plate 211, the second magnetic sheet 1320 may be extended between the antenna structure 1370 and the rear plate 211 so as to partially overlap the first magnetic sheet 1310 (see reference numeral 1321). The extended portion 1321 may participate in a change in characteristics of an electromagnetic field by electromagnetic coupling between the first magnetic sheet 1310 and the second magnetic sheet 1320 to improve a radiation performance.

According to various embodiments, the third magnetic sheet 1330 may be extended between the antenna structure 1370 and the rear plate 211 so as to partially overlap the first magnetic sheet 1310, when viewed from above the rear plate 211 (see reference numeral 1331). The extended portion 1331 may participate in a change in characteristics of an electromagnetic field by electromagnetic coupling between the first magnetic sheet 1310 and the third magnetic sheet 1330 to improve a radiation performance.

According to various embodiments, when viewed from above the rear plate 211, the extended portions 1331 and 1321 may be disposed at an electromagnetically isolated distance. When the extended portions 1331 and 1321 are not electromagnetically isolated, a loss (e.g., leakage) of electromagnetic energy may occur through electromagnetic coupling between the extended portions 1331 and 1321.

In various embodiments, the antenna structure 1370 may further include a portion 1341 extended to be spaced apart from the rear plate 211 with the second magnetic sheet 1320 interposed therebetween. According to various embodiments, the second magnetic sheet 1320 may be disposed at the extended portion 1341.

In various embodiments, the antenna structure 1370 may further include a portion 1342 extended to be spaced apart from the rear plate 211 with the third magnetic sheet 1330 interposed therebetween. According to various embodiments, the third magnetic sheet 1330 may be disposed at the extended portion 1342.

According to an example embodiment, the first magnetic sheet 1310, the second magnetic sheet 1320, and/or the third magnetic sheet 1330 may be implemented with various magnetic materials (e.g., nano sheet or ferrite sheet) involved in a magnetic flux or a frequency related to the antenna structure 1370 to improve a radiation performance through the first antenna structure and the second antenna structure.

According to various embodiments, the antenna structure 1370 may be disposed on the battery 350 in the electronic device 200 of FIG. 4. The second magnetic sheet 1320 or the third magnetic sheet 1330 of FIG. 13 may be used as an antenna structure for improving a radiation performance of the antenna structure 370 of FIG. 4. In this case, a shape of the third magnetic sheet 700 of FIG. 4 may be changed or omitted. According to various embodiments, the antenna structure 1370 of FIG. 13 may be implemented into a one-piece FPCB with the antenna structure 370 of FIG. 4.

Figure 14:
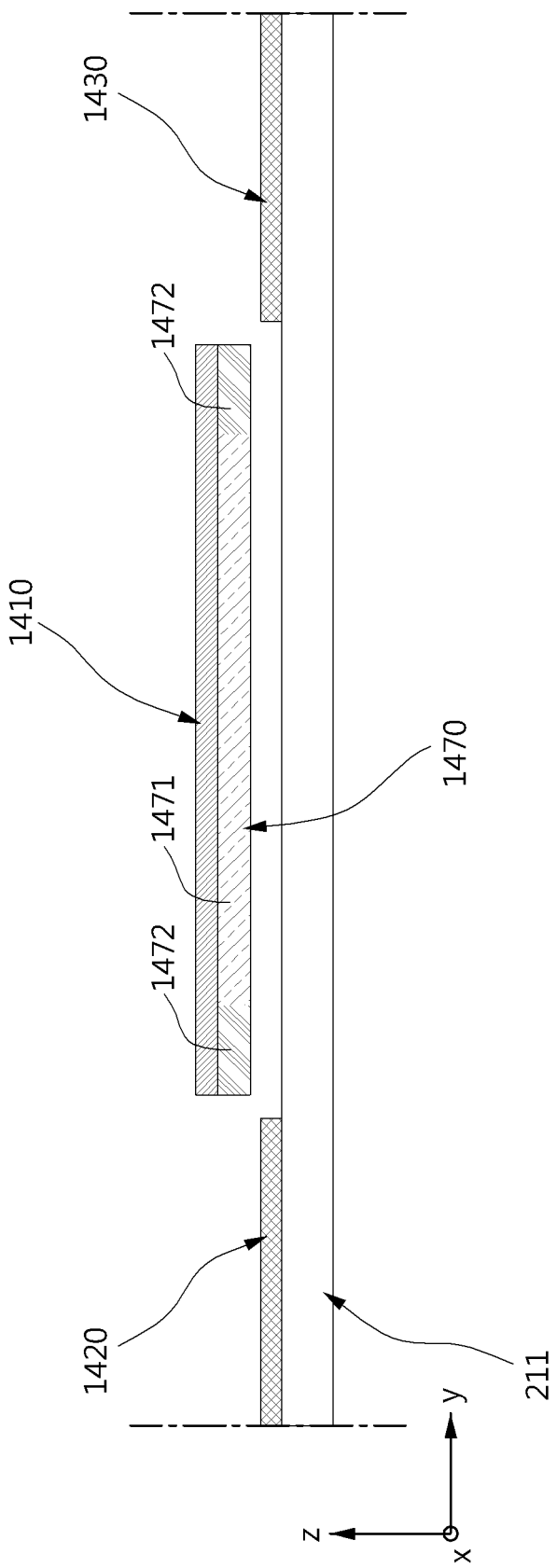
FIG. 14 is a cross-sectional view illustrating an example antenna structure according to various embodiments.

FIG. 14 is a cross-sectional view illustrating an example antenna structure 1470 according to various embodiments.

According to various embodiments, a disposition structure illustrated in FIG. 14 may be applied to the electronic device 200 of FIG. 4 or 7, and some components of FIG. 4 or 7 may be omitted or may be replaced with components of FIG. 14 according to the embodiment.

According to various embodiments, the embodiment of FIG. 14 may implement the antenna structure 1370 of FIG. 13 in another form. For example, the antenna structure 1470 may have a shape similar to or the same shape as that of the antenna structure 370 of FIG. 5, and include a first area 1471 (e.g., the first area 810 of FIG. 8) including a first conductive pattern and a second area 1472 (e.g., the second area 820 of FIG. 8) including the second conductive pattern. The second area 1472 may have a shape enclosing the first area 1471, when viewed from above the rear plate 211. According to an embodiment, the first area 1471 may transmit and/or receive a signal related to power through the first conductive pattern. According to an embodiment, the second area 1472 may transmit and/or receive a signal related to NFC through the second conductive pattern.

For example, when transmitting and/or receiving a signal of a frequency related to NFC through the second area 1472, if there is a conductive medium between the rear plate 211 and the second area 1472, a radiation performance through the second area 1472 may be deteriorated because of the conductive medium. According to an example embodiment, when viewed from above the rear plate 211 (e.g., when viewed in +z axis direction), a second magnetic sheet 1420 and a third magnetic sheet 1430 may be disposed so as to not overlap the second area 1472 of the antenna structure 1470 to secure a radiation performance related to NFC.

According to an example embodiment of the disclosure, an electronic device (e.g., the electronic device 200 of FIG. 7) may include: a housing (e.g., the housing 210 of FIG. 2A) including a front plate (e.g., the front plate 202 of FIG. 7) and a rear plate (e.g., the rear plate 211 of FIG. 7) opposite the front plate. The electronic device may include a display (e.g., the display 201 of FIG. 7) disposed in a space between the front plate and the rear plate and viewable through at least a portion of the front plate. The electronic device may include an antenna structure 370 of FIG. 7) having a first surface (e.g., the first surface 370a of FIG. 7) facing the rear plate in the space and a second surface (e.g., the second surface 370b of FIG. 7) facing a direction opposite the first surface and including at least one coil (e.g., the first conductive pattern 510 and the second conductive pattern 520 of FIG. 5) configured to transmit and/or receive a signal of a selected or designated frequency. The electronic device may include a first magnetic sheet (e.g., the first magnetic sheet 610 of FIG. 7) disposed at the first surface. When viewed from above the rear plate, the electronic device may include a second magnetic sheet (e.g., the second magnetic sheet 620 of FIG. 7) at least partially overlapping the first magnetic sheet and disposed at the second surface. The electronic device may include a third magnetic sheet (e.g., the third magnetic sheet 700 of FIG. 7 or 8) disposed closer to the rear plate than the second surface, and spaced apart from the first magnetic sheet to have electromagnetically designated isolation with the first magnetic sheet with the second magnetic sheet interposed therebetween, when viewed from above the rear plate.

According to an example embodiment of the disclosure, the third magnetic sheet (e.g., the third magnetic sheet 700 of FIG. 8) may not overlap the second magnetic sheet (e.g., the second magnetic sheet 620 of FIG. 8), when viewed from above the rear plate (e.g., the rear plate 211 of FIG. 8).

According to an example embodiment of the disclosure, the third magnetic sheet (e.g., the third magnetic sheet 1100 of FIG. 11) may overlap the second magnetic sheet (e.g., the second magnetic sheet 1120 of FIG. 11), when viewed from above the rear plate (e.g., the rear plate 211 of FIG. 11) (see reference numeral 1124 of FIG. 11).

According to an example embodiment of the disclosure, the antenna structure (e.g., the antenna structure 370 of FIG. 5) may comprise a flexible printed circuit (FPCB).

According to an example embodiment of the disclosure, the third magnetic sheet (e.g., the third magnetic sheet 700 of FIG. 8) may be disposed at the rear plate (e.g., the rear plate 211 of FIG. 8).

According to an example embodiment of the disclosure, the third magnetic sheet (e.g., the third magnetic sheet 700 of FIG. 8) may be disposed at the first surface (e.g., the first surface 370a of FIG. 8) of the antenna structure (e.g., the antenna structure 370 of FIG. 8) (see reference numeral 830 of FIG. 8).

According to an example embodiment of the disclosure, the electronic device may further include a battery (e.g., the battery 350 of FIG. 4 or 7) disposed in the space and an FPCB (e.g., the first electrical path 450 or the second electrical path 460 of FIG. 4) disposed across the battery between the battery and the rear plate (e.g., the rear plate 211 of FIG. 7). The third magnetic sheet (e.g., the third magnetic sheet 700 of FIG. 4 or 7) may at least partially overlap the FPCB, when viewed from above the rear plate.

According to an example embodiment of the disclosure, the electronic device may further include a first substrate assembly (e.g., the first substrate assembly 341 of FIG. 3) and a second substrate assembly (e.g., the second substrate assembly 342 of FIG. 3) disposed in the space, spaced apart from each other with the battery (e.g., the battery 350 of FIG. 4) interposed therebetween, and electrically connected through the FPCB (e.g., the first electrical path 450 or the second electrical path 460 of FIG. 4), when viewed from above the rear plate (e.g., the rear plate 211 of FIG. 7). The antenna structure (e.g., the antenna structure 370 of FIG. 4) may be disposed to at least partially overlap the first substrate assembly, when viewed from above the rear plate.

According to an example embodiment of the disclosure, the antenna structure (e.g., the antenna structure 370 of FIG. 8) may include a first area (e.g., the first area 810 of FIG. 8) including a first coil (e.g., the first conductive pattern 510 of FIG. 5) and a second area (e.g., the second area 820 of FIG. 8) including a second coil (e.g., the second conductive pattern 520 of FIG. 5), the second coil enclosing the first area, when viewed from above the rear plate (e.g., the rear plate 211 of FIG. 8).

According to an example embodiment of the disclosure, the first coil (e.g., the first conductive pattern 510 of FIG. 5) may transmit and/or receive a first signal having a frequency related to magnetic secure transmission (MST) or wireless power. The second coil (e.g., the second conductive pattern 520 of FIG. 5) may transmit and/or receive a second signal having a frequency related to near field communication (NFC).

According to an example embodiment of the disclosure, the first magnetic sheet (e.g., first magnetic sheet 610 of FIG. 4) and the second magnetic sheet (e.g., the second magnetic sheet 620 of FIG. 6) may overlap each other in the first area (e.g., the first area 810 of FIG. 8).

According to an example embodiment of the disclosure, an electronic device (e.g., the electronic device 200 of FIG. 2A) may include: a housing (e.g., the housing 210 of FIG. 2A) including a front plate (e.g., the front plate 202 of FIG. 3) and a rear plate (e.g., the rear plate 211 of FIG. 3) disposed opposite the front plate. The electronic device may include a display (e.g., the display 201 of FIG. 3) disposed in a space between the front plate and the rear plate and viewable through at least a portion of the front plate. The electronic device may include an antenna structure (e.g., the antenna structure 370 of FIG. 9) including at least one coil (e.g., the first conductive pattern 510 or the second conductive pattern 520 of FIG. 5) having a first surface (e.g., the first surface 370a of FIG. 9) facing the rear plate in the space and a second surface (e.g., the second surface 370b of FIG. 9) facing in a direction opposite the first surface, the antenna structure configured to transmit and/or receive a signal of a selected or designated frequency. The electronic device may include a first magnetic sheet (e.g., the first magnetic sheet 910 of FIG. 9) disposed at the first surface. The electronic device may include a second magnetic sheet (e.g., the second magnetic sheet 920 of FIG. 9) at least partially overlapping the first magnetic sheet and disposed at the second surface, when viewed from above the rear plate. The electronic device may include a third magnetic sheet (e.g., the third magnetic sheet 900 of FIG. 9) disposed closer to the front plate than the first surface, and spaced apart from the second magnetic sheet to have electromagnetically designated isolation with the second magnetic sheet with the first magnetic sheet interposed therebetween, when viewed from above the rear plate.

According to an example embodiment of the disclosure, the third magnetic sheet (e.g., the third magnetic sheet 900 of FIG. 9) may not overlap the first magnetic sheet (e.g., the first magnetic sheet 910 of FIG. 9), when viewed from above the rear plate (e.g., the rear plate 211 of FIG. 9).

According to an example embodiment of the disclosure, the third magnetic sheet (e.g., the third magnetic sheet 1000 of FIG. 10) may overlap the first magnetic sheet (e.g., the first magnetic sheet 1010 of FIG. 10), when viewed from above the rear plate (e.g., the rear plate 211 of FIG. 10).

According to an example embodiment of the disclosure, the electronic device may further include a battery (e.g., the battery 350 of FIG. 10) disposed in the space and an FPCB (e.g., the first electrical path 450 or the second electrical path 460 of FIG. 4) disposed across the battery between the battery and the rear plate (e.g., the rear plate 211 of FIG. 3). The third magnetic sheet (e.g., the third magnetic sheet 900 of FIG. 9) may at least partially overlap the FPCB, when viewed from above the rear plate.

According to an example embodiment of the disclosure, the third magnetic sheet (e.g., the third magnetic sheet 900 of FIG. 9) may be disposed at the FPCB (e.g., the electrical path 460 of FIG. 4).

According to an example embodiment of the disclosure, the third magnetic sheet (e.g., the third magnetic sheet 900 of FIG. 9) may be disposed at the second surface (e.g., the second surface 370b of FIG. 9) of the antenna structure (e.g., the antenna structure 370 of FIG. 9) (see reference numeral 830 of FIG. 9).

According to an example embodiment of the disclosure, the antenna structure (e.g., the antenna structure 370 of FIG. 9) may include a first area (e.g., the first area 810 of FIG. 9) including a first coil (e.g., the first conductive pattern 510 of FIG. 5) and a second area (e.g., the second area 820 of FIG. 9) including a second coil (e.g., the second conductive pattern 520 of FIG. 5), the second coil enclosing the first area, when viewed from above the rear plate (e.g., the rear plate 211 of FIG. 9).

According to an example embodiment of the disclosure, an electronic device (e.g., the electronic device 200 of FIG. 2A) may include: a housing (e.g., the housing 210 of FIG. 2A) including a front plate (e.g., the front plate 202 of FIG. 3) and a rear plate (e.g., the rear plate 211 of FIG. 3) disposed opposite the front plate. The electronic device may include a display (e.g., the display 201 of FIG. 3) disposed in a space between the front plate and the rear plate and at least partially disposed along the front plate. The electronic device may include a flexible printed circuit board (FPCB) (e.g., the antenna structure 1370 of FIG. 13) including at least one coil having a first surface facing the rear plate in the space and a second surface facing a direction opposite the first surface, the FPCB configured to transmit and/or receive a signal of a selected or designated frequency. The electronic device may include a first magnetic sheet (e.g., the first magnetic sheet 1310 of FIG. 13) disposed at the second surface. The electronic device may include a second magnetic sheet (e.g., the second magnetic sheet 1320 of FIG. 13) and a third magnetic sheet (e.g., the third magnetic sheet 1330 of FIG. 13) disposed closer to the rear plate than the first surface and spaced apart from each other with the first magnetic sheet interposed therebetween, when viewed from above the rear plate.

According to various example embodiments of the disclosure, by disposing a helical antenna (e.g., helical conductive pattern) near the rear plate and a plurality of magnetic sheets around the helical antenna in order to absorb and/or shield noise from outside, a radiation performance of the helical antenna can be secured. Further, even if a size of the helical antenna is reduced, a radiation performance of the helical antenna can be secured because of an electromagnetic interaction between the plurality of magnetic sheets. Because a size of the helical antenna can be reduced while securing a radiation performance, it can be easy to secure a space occupied by the battery in order to increase a battery capacity or to slim the electronic device.

While the disclosure has been illustrated and described with reference to various example embodiments thereof, it will be understood that the various example embodiments are intended to be illustrative, not limiting. It will be further understood by one of ordinary skill in the art that various changes in form and detail may be made without departing from the true spirit and full scope of the disclosure, including the appended claims and equivalents thereof.

What is claimed is:

1. An electronic device, comprising:
a housing comprising a front plate and a rear plate disposed opposite the front plate;
a display disposed in a space between the front plate and the rear plate and viewable through at least a portion of the front plate;
an antenna structure comprising at least one coil, the antenna structure having a first surface facing the rear plate in the space and a second surface facing a direction opposite the first surface, the antenna structure configured to transmit and/or receive a signal of a selected or designated frequency;
a first magnetic sheet disposed at the first surface;
a second magnetic sheet at least partially overlapping the first magnetic sheet when viewed from above the rear plate, the second magnetic sheet being disposed at the second surface; and
a third magnetic sheet disposed closer to the rear plate than the second surface, and spaced apart from the first magnetic sheet to have electromagnetically designated isolation with the first magnetic sheet with the second magnetic sheet interposed therebetween, when viewed from above the rear plate.

2. The electronic device of claim 1, wherein the third magnetic sheet does not overlap the second magnetic sheet, when viewed from above the rear plate.

3. The electronic device of claim 1, wherein the third magnetic sheet at least partially overlaps the second magnetic sheet, when viewed from above the rear plate.

4. The electronic device of claim 1, wherein the antenna structure comprises a flexible printed circuit (FPCB).

5. The electronic device of claim 1, wherein the third magnetic sheet is disposed at the rear plate.

6. The electronic device of claim 1, wherein the third magnetic sheet is disposed at the first surface of the antenna structure.

7. The electronic device of claim 1, further comprising a battery disposed in the space and an FPCB disposed across the battery between the battery and the rear plate,
wherein the third magnetic sheet at least partially overlaps the FPCB, when viewed from above the rear plate.

8. The electronic device of claim 7, further comprising a first substrate assembly and a second substrate assembly disposed in the space, the first substrate and the second substrate spaced apart from each other with the battery interposed therebetween, the first substrate and the second substrate being electrically connected through the FPCB,
wherein the antenna structure is disposed to at least partially overlap the first substrate assembly, when viewed from above the rear plate.

9. The electronic device of claim 1, wherein the antenna structure comprises a first area comprising a first coil and a second area comprising a second coil, the second coil enclosing the first area, when viewed from above the rear plate.

10. The electronic device of claim 9, wherein the first coil is configured to transmit and/or receive a first signal having a frequency for magnetic secure transmission (MST) or wireless power, and
the second coil is configured to transmit and/or receive a second signal having a frequency for near field communication (NFC).

11. The electronic device of claim 9, wherein the first magnetic sheet and the second magnetic sheet at least partially overlap in the first area.

12. An electronic device, comprising:
a housing comprising a front plate and a rear plate disposed opposite the front plate;
a display disposed in a space between the front plate and the rear plate and viewable through at least a portion of the front plate;
an antenna structure comprising at least one coil, the antenna structure having a first surface facing the rear plate in the space and a second surface facing opposite the first surface, the antenna structure configured to transmit and/or receive a signal of a selected or designated frequency;
a first magnetic sheet disposed at the first surface;
a second magnetic sheet at least partially overlapping the first magnetic sheet when viewed from above the rear plate, the second magnetic sheet being disposed at the second surface; and
a third magnetic sheet disposed closer to the front plate than the first surface, and spaced apart from the second magnetic sheet to have electromagnetically designated isolation with the second magnetic sheet with the first magnetic sheet interposed therebetween, when viewed from above the rear plate.

13. The electronic device of claim 12, wherein the third magnetic sheet does not overlap the first magnetic sheet, when viewed from above the rear plate.

14. The electronic device of claim 12, wherein the third magnetic sheet at least partially overlaps the first magnetic sheet, when viewed from above the rear plate.

15. The electronic device of claim 12, wherein the antenna structure comprises a flexible printed circuit (FPCB).

16. The electronic device of claim 12, further comprising a battery disposed in the space and an FPCB disposed across the battery between the battery and the rear plate,
wherein the third magnetic sheet at least partially overlaps the FPCB, when viewed from above the rear plate.

17. The electronic device of claim 16, wherein the third magnetic sheet is disposed at the FPCB.

18. The electronic device of claim 12, wherein the third magnetic sheet is disposed at the second surface of the antenna structure.

19. The electronic device of claim 12, wherein the antenna structure comprises a first area comprising a first coil and a second area comprising a second coil, the second coil enclosing the first area, when viewed from above the rear plate.

20. An electronic device, comprising:
a housing comprising a front plate and a rear plate disposed opposite the front plate;
a display disposed in a space between the front plate and the rear plate and at least partially disposed along the front plate;
a flexible printed circuit board (FPCB) comprising at least one coil having a first surface facing the rear plate in the space and a second surface facing a direction opposite the first surface, the FPCB configured to transmit and/or receive a signal of a selected or designated frequency;
a first magnetic sheet disposed at the second surface; and
a second magnetic sheet and third magnetic sheet disposed closer to the rear plate than the first surface and spaced apart from each other with the first magnetic sheet interposed therebetween, when viewed from above the rear plate.

* * * * *